(12) United States Patent
Parikh et al.

(10) Patent No.: US 8,048,212 B2
(45) Date of Patent: *Nov. 1, 2011

(54) INERTIAL GAS-LIQUID SEPARATOR WITH VALVE AND VARIABLE FLOW ACTUATOR

(75) Inventors: Chirag D. Parikh, Madison, WI (US); Benjamin L. Scheckel, Stoughton, WI (US); Ryan W. Rutzinski, Waukesha, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 876 days.

This patent is subject to a terminal disclaimer.

(21) Appl. No.: 12/099,204

(22) Filed: Apr. 8, 2008

(65) Prior Publication Data

US 2009/0120854 A1    May 14, 2009

Related U.S. Application Data

(63) Continuation-in-part of application No. 11/960,830, filed on Dec. 20, 2007, now Pat. No. 7,896,946, which is a continuation-in-part of application No. 11/622,051, filed on Jan. 11, 2007, now Pat. No. 7,648,543, which is a continuation-in-part of application No. 11/168,688, filed on Jun. 28, 2005, now Pat. No. 7,473,291, which is a continuation-in-part of application No. 10/946,603, filed on Sep. 21, 2004, now Pat. No. 7,238,216.

(51) Int. Cl.
*B01D 45/00* (2006.01)

(52) U.S. Cl. ............... 96/402; 55/420; 55/445; 55/446; 55/DIG. 14; 96/421

(58) Field of Classification Search .................. 55/329, 55/332, 418–420, 465, 468, DIG. 14, DIG. 19; 96/402; 422/105, 110, 112
See application file for complete search history.

(56) References Cited

U.S. PATENT DOCUMENTS

| | | | |
|---|---|---|---|
| 1,548,288 A | 8/1925 | Smith |
| 3,201,925 A | 8/1965 | Shada |
| 3,433,231 A | 3/1969 | Siragusa |
| 3,923,480 A | 12/1975 | Visch |
| 4,012,209 A | 3/1977 | McDowell et al. |
| 4,014,673 A | 3/1977 | Kinnison |
| 4,401,093 A | 8/1983 | Gates, Jr. et al. |
| 4,993,517 A | 2/1991 | Leipelt et al. |
| 5,129,371 A | 7/1992 | Rosalik, Jr. |
| 5,460,147 A | 10/1995 | Bohl |

(Continued)

FOREIGN PATENT DOCUMENTS

CH     127029     5/1927

(Continued)

OTHER PUBLICATIONS

Highly Efficient Oil Separation Systems for Minimised Oil Carry Over, MTZ Apr. 2008, vol. 69, pp. 32-27.

*Primary Examiner* — Duane Smith
*Assistant Examiner* — Sonji Turner
(74) *Attorney, Agent, or Firm* — Andrus, Sceales, Starke & Sawall, LLP

(57) ABSTRACT

A self-governing continuously variable inertial gas-liquid separator has an axially movable valve controlling axial flow through a nozzle orifice, and a variable flow controller upstream of and controlling the valve.

15 Claims, 32 Drawing Sheets

U.S. PATENT DOCUMENTS

| | | | |
|---|---|---|---|
| 5,562,087 A | 10/1996 | Wright | |
| 5,564,401 A | 10/1996 | Dickson | |
| 6,073,618 A | 6/2000 | Sanders et al. | |
| 6,074,448 A | 6/2000 | Schulz et al. | |
| 6,247,463 B1 | 6/2001 | Fedorowicz et al. | |
| 6,279,556 B1 | 8/2001 | Busen et al. | |
| 6,290,738 B1 | 9/2001 | Holm | |
| 6,293,268 B1 | 9/2001 | Mammarella | |
| 6,354,283 B1 | 3/2002 | Hawkins et al. | |
| 6,402,798 B1 | 6/2002 | Kallsen et al. | |
| 6,418,918 B2 | 7/2002 | Mammarella | |
| 6,478,018 B2 | 11/2002 | Fedorowicz et al. | |
| 6,478,019 B2 | 11/2002 | Fedorowicz et al. | |
| 6,505,615 B2 | 1/2003 | Pietschner | |
| 6,533,712 B1 | 3/2003 | Miller et al. | |
| 6,568,540 B1 | 5/2003 | Holzmann et al. | |
| 6,576,045 B2 | 6/2003 | Liu et al. | |
| 6,601,385 B2 | 8/2003 | Verdegan et al. | |
| 6,626,163 B1 | 9/2003 | Busen et al. | |
| 6,684,864 B1 | 2/2004 | Busen et al. | |
| 6,797,040 B2 | 9/2004 | Lenzing | |
| 6,973,925 B2 | 12/2005 | Sauter et al. | |
| 7,080,636 B2 | 7/2006 | Knaus et al. | |
| 7,152,589 B2 | 12/2006 | Ekeroth et al. | |
| 7,156,901 B2 | 1/2007 | Hallgren et al. | |
| 7,238,216 B2 | 7/2007 | Malgorn | |
| 2005/0000572 A1 | 1/2005 | Muller | |
| 2006/0059875 A1 | 3/2006 | Malgorn et al. | |
| 2006/0062699 A1 | 3/2006 | Evenstad et al. | |
| 2006/0081229 A1 | 4/2006 | Gronberg | |
| 2006/0249128 A1 | 11/2006 | Shieh | |
| 2007/0062887 A1 | 3/2007 | Schwandt et al. | |
| 2007/0256566 A1 | 11/2007 | Faber et al. | |

FOREIGN PATENT DOCUMENTS

| | | |
|---|---|---|
| DE | 1544126 | 6/1969 |
| DE | 10051307 | 5/2002 |
| DE | 10320215 | 12/2004 |
| DE | 102005042286 | 4/2007 |
| EP | 0754840 | 1/1997 |
| EP | 1068890 | 1/2001 |
| EP | 1477641 | 11/2004 |
| FR | 1406047 | 7/1965 |
| FR | 2835764 | 8/2003 |
| FR | 2852056 | 9/2004 |
| WO | WO-2006/119737 | 11/2006 |
| WO | WO-2007/028351 | 3/2007 |
| WO | WO-2007/137934 | 12/2007 |
| WO | WO-2007/138008 | 12/2007 |

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

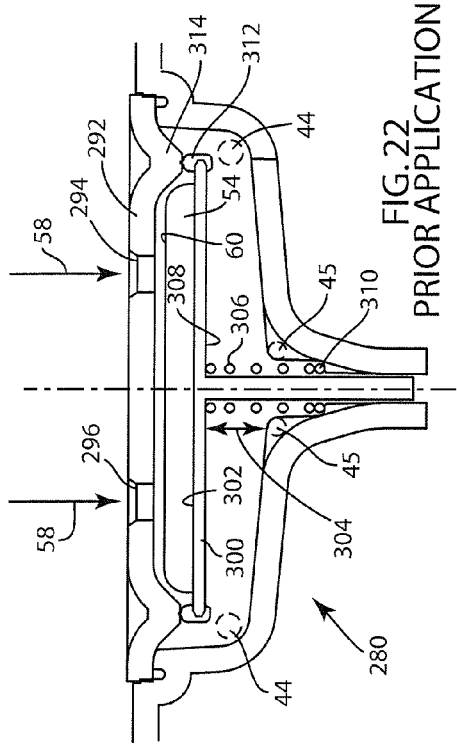
FIG. 21
PRIOR APPLICATION
FIG. 22
PRIOR APPLICATION
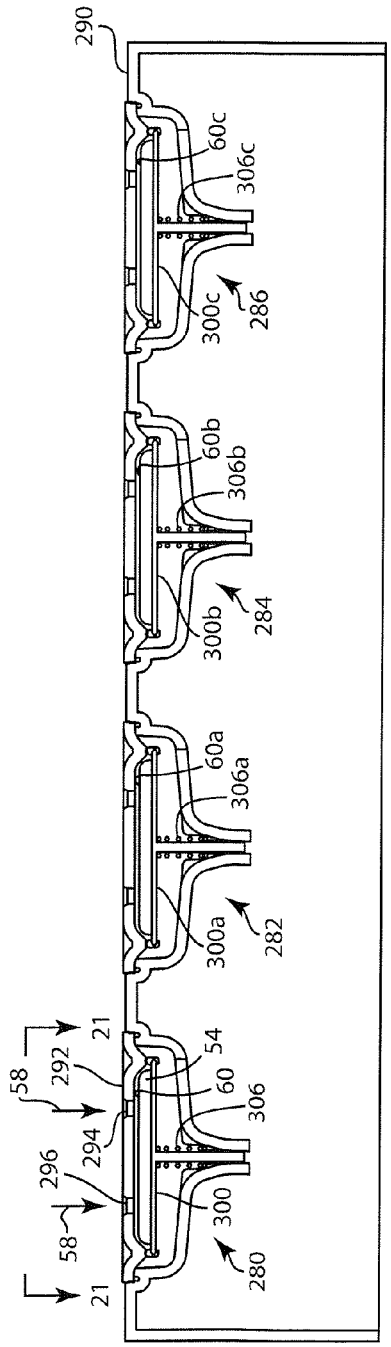
FIG. 20
PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION

PRIOR APPLICATION ns. No. 7,238,216,
INERTIAL GAS-LIQUID SEPARATOR WITH VALVE AND VARIABLE FLOW ACTUATOR

CROSS-REFERENCE TO RELATED APPLICATIONS

This application is a continuation-in-part of U.S. patent application Ser. No. 11/960,830, filed Dec. 20, 2007, now U.S. Pat. No. 7,896,946, issued Mar. 1, 2011, which is a continuation-in-part of U.S. patent application Ser. No. 11/622,051, filed Jan. 11, 2007, now U.S. Pat. No. 7,648,543, issued Jan. 19, 2010, which is a continuation-in-part of U.S. patent application Ser. No. 11/168,688, filed Jun. 28, 2005, now U.S. Pat. No. 7,473,291, issued Jan. 6, 2009, which is a continuation-in-part of U.S. patent application Ser. No. 10/946,603, filed Sep. 21, 2004, now U.S. Pat. No. 7,238,216, issued Jan. 6, 2009, all incorporated herein, and the benefit of which priority is claimed.

BACKGROUND AND SUMMARY

The above noted parent applications relate to inertial gas-liquid impactor separators for removing liquid particles from a gas-liquid stream, including in engine crankcase ventilation separation applications, including closed crankcase ventilation (CCV) and open crankcase ventilation (OCV) systems.

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting the noted liquid separation. Such inertial impactors have various uses, including in oil separation applications for blowby gases from the crankcase of an internal combustion engine.

In one parent embodiment, a system is provided for separating oil from blowby gas of an internal combustion engine, including providing increased separation efficiency early in the life of the engine without suffering objectionably high pressure drop late in the life of the engine including end-of-life condition of the engine. As an engine wears, more blowby gas is created and the impactor in the inertial gas-liquid separator sees a larger flow and increased pressure from the crankcase. When this happens, the separator actually begins to perform with higher efficiency, but also has a larger pressure drop. Standard impactor separators must be designed to meet this end-of-life condition in order not to produce too high of a pressure drop. This means the efficiency early in the life of the engine may not be optimized.

In one parent embodiment, multiple stages allow the impactor design to be optimized for several points in the life of the engine. For example, in one parent embodiment, the blowby gas is exposed to fewer nozzles in the beginning when pressure and flow are lower. As pressure increases, more stages are opened. This means that efficiency can be high from the beginning of life, and pressure drop is controlled as the engine wears. This parent embodiment provides improved performance by delivering a more consistent efficiency and pressure drop over the life of the engine.

In another parent embodiment, the device has one impactor stage that is constantly open to blowby gas flow, and one or more stages that are opened with relief valves as pressure increases. In one preferred parent embodiment, only the constant stage impactor is open at the beginning-of-life of the engine, and all stages will be open by the end-of-life of the engine.

In another parent embodiment, an inertial gas-liquid separator is provided with variable orifice jet nozzle structure having a variable orifice area dependent upon axial movement of a plunger relative to a housing sleeve. The variable orifice jet nozzle structure may be used with or without the noted constantly open impactor stage of the above parent embodiment.

The present invention arose during continuing development efforts relating to the above noted parent inventions, and provides improvements in inertial gas-liquid impactor separators, including valved variable flow.

BRIEF DESCRIPTION OF THE DRAWINGS

Parent Applications

FIGS. 1-38 are taken from the above noted parent applications.

FIG. 1 is a schematic sectional illustration of an inertial gas-liquid impactor separator in accordance with the parent '603 application.

FIG. 2 is a sectional view taken along line 2-2 of FIG. 1.

FIG. 3 is a schematic perspective view of a portion of FIG. 1 but showing another embodiment.

FIG. 4 is a schematic perspective view of a portion of FIG. 1 but showing another embodiment.

FIG. 5 is a perspective elevational view of an inertial gas-liquid impactor separator incorporating the embodiment of FIG. 4.

FIG. 6 is a perspective view partially broken away of the construction of FIG. 5.

FIG. 7 is a perspective view partially broken away of the construction of FIG. 5.

FIG. 8 is an exploded perspective view of a portion of FIG. 5.

FIG. 9 is a sectional view of the construction of FIG. 5 showing a first position of the actuator.

FIG. 10 is like FIG. 9 and shows another position of the actuator.

FIG. 11 is a schematic perspective view of a portion of FIG. 1 but showing another embodiment.

FIG. 12 is a schematic illustration of a portion of another inertial gas-liquid impactor separator in accordance with the parent '603 application.

FIG. 13 is a sectional view of an inertial gas-liquid impactor separator incorporating the embodiment of FIG. 12.

FIG. 14 is like FIG. 13 and shows another position of the actuator.

FIG. 15 is a sectional view of the construction of FIG. 13.

FIG. 16 is a perspective view of the construction of FIG. 13.

FIG. 17 is an exploded perspective view of the construction of FIG. 16.

FIG. 18 is another exploded perspective view of the construction of FIG. 16.

FIG. 19 is a schematic perspective view of a portion of another inertial gas-liquid impactor separator in accordance with the parent '603 application.

FIG. 20 is a sectional view of another embodiment of an inertial gas-liquid impactor separator in accordance with the parent '603 application.

FIG. 21 is a top elevation view taken along line 21-21 of FIG. 20.

FIG. 22 is an enlarged view of a portion of FIG. 20.

FIG. 23 is a schematic sectional view of an inertial gas-liquid separator in accordance with the parent '688 application.

FIG. 24 is like FIG. 23 and shows another embodiment.

FIG. 25 is like FIG. 23 and shows another embodiment.

FIG. 26 is like FIG. 23 and shows another embodiment.

FIG. 27 is schematic sectional illustration of an inertial gas-liquid impactor separator in accordance with the parent '051 application.

FIG. 28 is like FIG. 27 and shows a further operational condition.

FIG. 29 is an enlarged view of a portion of FIG. 27.

FIG. 30 is a sectional view taken along line 30-30 of FIG. 29.

FIG. 31 is a perspective view from below of the construction of FIG. 29.

FIG. 32 is a schematic sectional illustration of another embodiment of an inertial gas-liquid impactor separator.

FIG. 33 is like FIG. 32 and shows a further embodiment.

FIG. 34 is like FIG. 32 and shows a further embodiment.

FIG. 35 is an end elevation view of the device of FIG. 34.

FIG. 36 is a perspective view of a component of FIG. 32.

FIG. 37 is like FIG. 32 and shows a further embodiment.

FIG. 38 is a schematic sectional view of another embodiment of an inertial gas-liquid impactor separator.

Present Application

Figure 39:
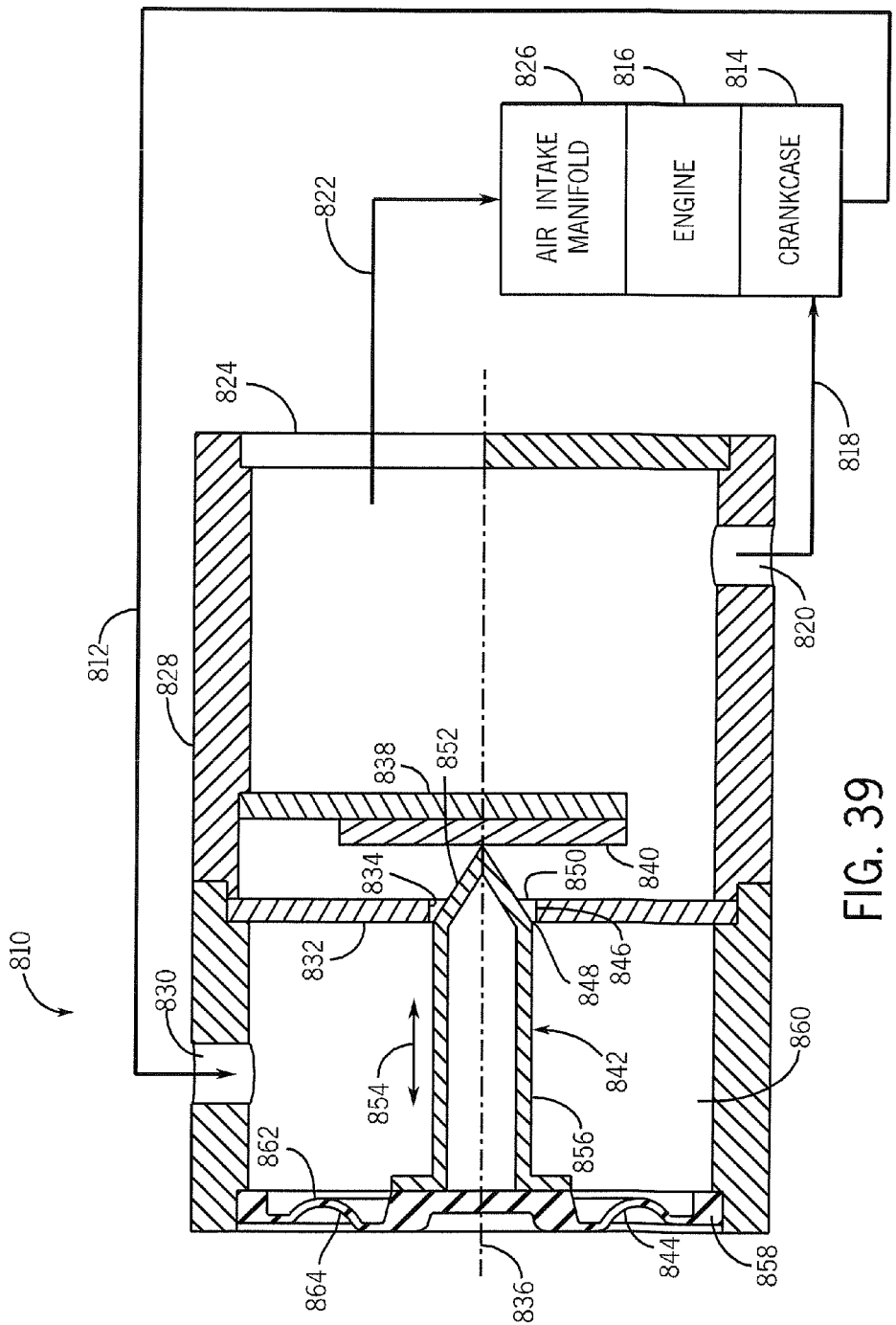

FIG. 39 is a schematic sectional illustration of an inertial gas-liquid impactor separator in accordance with the invention.

Figures 40, 41:
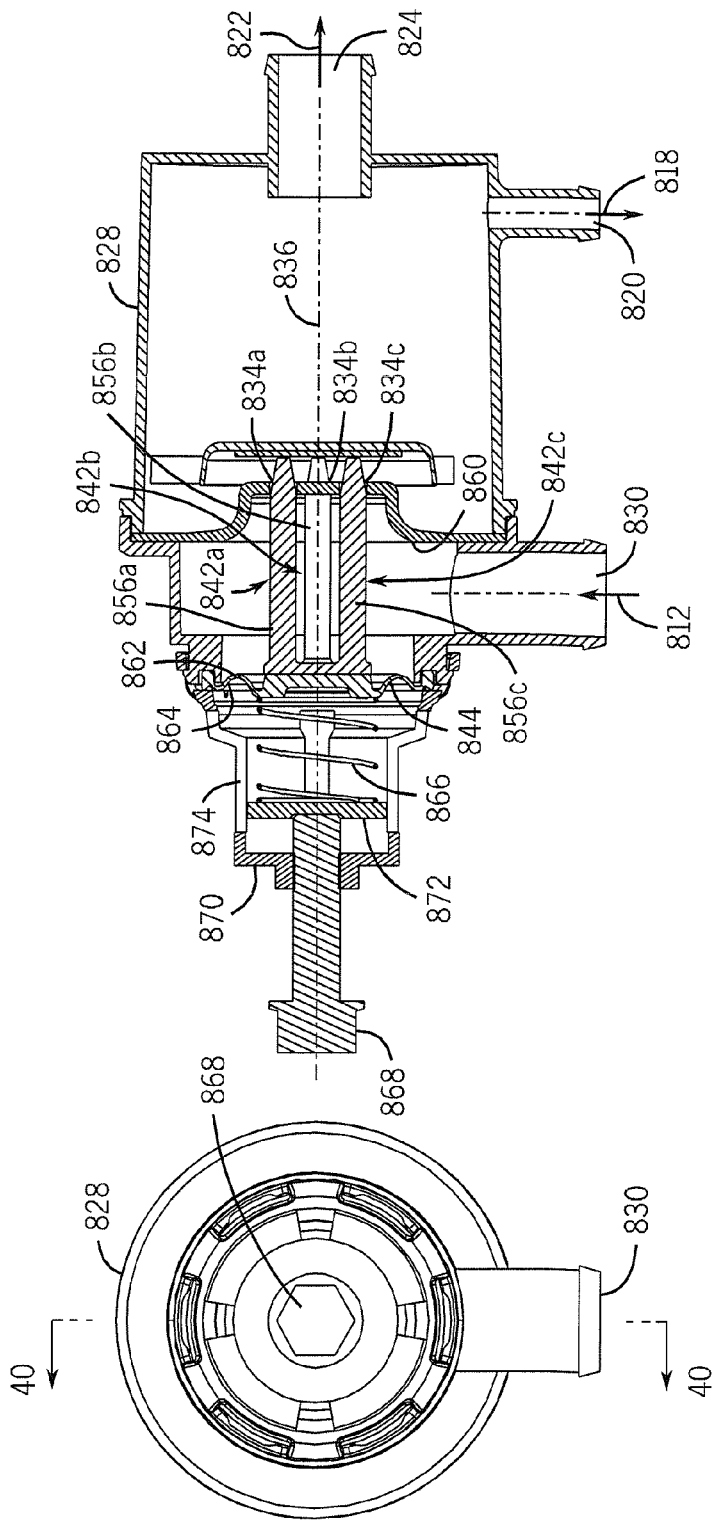

FIG. 40 is a sectional view of another embodiment of an inertial gas-liquid impactor separator in accordance with the invention, taken along line 40-40 of FIG. 41.

FIG. 41 is an end view of the separator of FIG. 40.

DETAILED DESCRIPTION

Parent Applications

The following description of FIGS. 1-38 is taken from the above noted parent applications.

Figure 1:
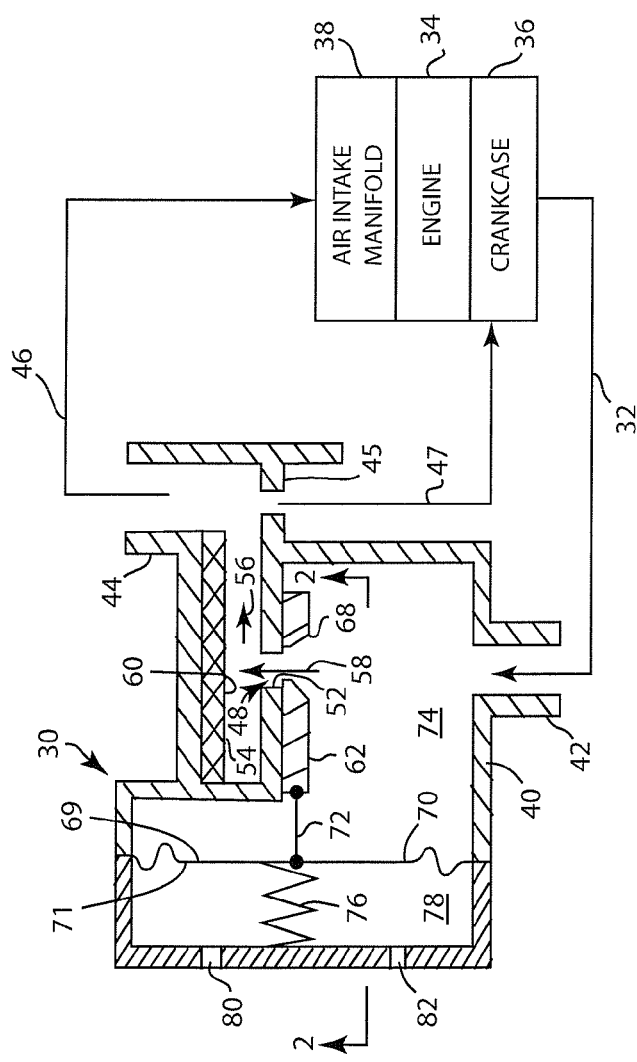

FIG. 1 shows an inertial gas-liquid impactor separator 30 for coalescing and removing liquid particles from a gas-liquid stream 32, shown in an exemplary crankcase ventilation separation application for an internal combustion engine 34. In such application, it is desired to vent blow-by gases from crankcase 36 of engine 34. Untreated, these gases contain particulate matter in the form of oil mist and soot. It is desirable to control the concentration of the contaminants, especially if the blow-by gases are to be recirculated back to the engine's air intake system, for example at air intake manifold 38. The oil mist droplets are generally less than 5μ in diameter, and hence are difficult to remove using conventional fibrous filter media while at the same time maintaining low flow resistance as the media collects and becomes saturated with oil and contaminants.

Separator 30 includes a housing 40 having an inlet 42 for receiving gas-liquid stream 32 from engine crankcase 36, an outlet 44 for discharging a gas stream 46 to air intake manifold 38, and a drain 45 draining separated fluid at 47 from impactor collector 54 and returning collected oil droplets at 47 to crankcase 36. Nozzle structure 48 in the housing has a plurality of nozzles provided by orifices such as 50, 52, FIGS. 1, 2, receiving the gas-liquid stream at 58 from inlet 42 and accelerating the gas-liquid stream through nozzles 50, 52. The plurality of nozzles provides a cumulative flow in parallel therethrough. An inertial impactor collector 54 in the housing is in the path of the accelerated gas-liquid stream at 58 and causes liquid particle separation by a sharp directional change as shown at 56. In the preferred embodiment, impactor collector 54 has a rough porous collection or impingement surface 60 causing liquid particle separation from the gas-liquid stream, and is like that shown in U.S. Pat. No. 6,290,738, incorporated herein by reference. Nozzle orifices 50, 52 may have a venturi or frustoconical shape as in the incorporated '738 patent.

Figure 2:
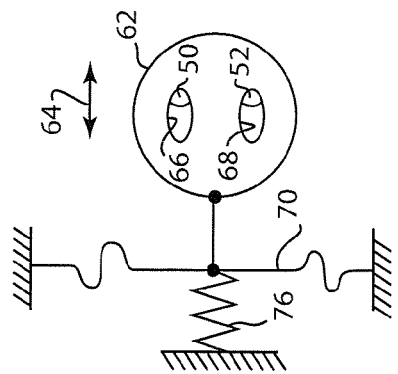

A variable flow actuator 62 varies the cumulative flow through the plurality of nozzles in response to a given parameter. In one desirable embodiment, cumulative flow velocity is varied, though other flow characteristics may be varied. The gas-liquid stream flows axially along an axial flow direction at 58 through orifices 50, 52. Actuator 62 is movable along a given direction relative to the orifices to vary the noted cumulative flow. In one embodiment, actuator 62 is moveable along the noted given direction relative to the orifices to vary the total area and hence the resultant flow velocity. In FIGS. 1, 2, actuator 62 is a disk or plate movable across one or more of the orifices to change the cross-sectional area thereof transverse to axial flow direction 58. Disk 62 is movable as shown at arrow 64 left-right in FIGS. 1, 2, transversely to axial flow direction 58. In the embodiment of FIGS. 1, 2, disk 62 as a plurality of elongated slots or openings 66, 68 aligned with respective nozzle orifices 50, 52 and transversely slidable therealong to vary the size thereof available to axial flow therethrough, and hence to vary the cumulative flow area. In a further embodiment, one or more of nozzle orifices 50, 52 may be closed or opened during movement of disk 62, to thus vary the number of orifices available to axial flow therethrough, to thus vary the noted cumulative flow area. In a further embodiment, movement of actuator disk 62 varies both the size and number of the orifices, for example movement of actuator disk 62 back and forth along direction 64 may expand and restrict the orifices along a cross-sectional area thereof transverse to flow direction 58, to vary the size of the orifices, and movement of actuator disk 62 back and forth along direction 64 may open and close other of the orifices, to vary the number of orifices through which the gas-liquid stream flows.

In one embodiment, the noted parameter to which variable flow actuator 62 responds is pressure of the gas-liquid stream. Housing 40 includes a pressure sensor 70 in the form of a diaphragm or membrane coupled through link 72 to actuator 62 to actuate the latter to move left-right at 64 in FIGS. 1, 2. As the pressure of the gas-liquid stream increases, diaphragm 70 moves leftwardly in FIG. 1, which in preferred form increases the size of orifices 50, 52, etc. (increases the cross-sectional flow area thereof) and/or increases the number of orifices 50, 52, etc. open to flow therethrough. The increasing pressure of the gas-liquid flow stream in housing chamber 74 overcomes the bias spring 76 to cause leftward movement of diaphragm 70. If the gas-liquid flow pressure decreases, then biasing spring 76 moves actuator disk 62 rightwardly in FIG. 1, preferably to reduce the size and/or number of orifices 50, 52, etc. In this manner, a desired pressure differential ΔP (delta P) is maintained, eliminating the need to make compromises between minimum and maximum flow rates, engine sizes, changing conditions such as engine wear, speed, braking, etc. The variable flow actuator maximizes efficiency by adapting to different engine sizes, flow ratings, and changing conditions during engine operation, and overcomes prior trade-offs required in a fixed flow separator. In the embodiment of FIG. 1, housing chamber 78 on the opposite side of diaphragm 70 from chamber 74 is vented to atmosphere as at vent openings 80, 82, for referencing ΔP, though other reference pressures may be used.

Figure 3:
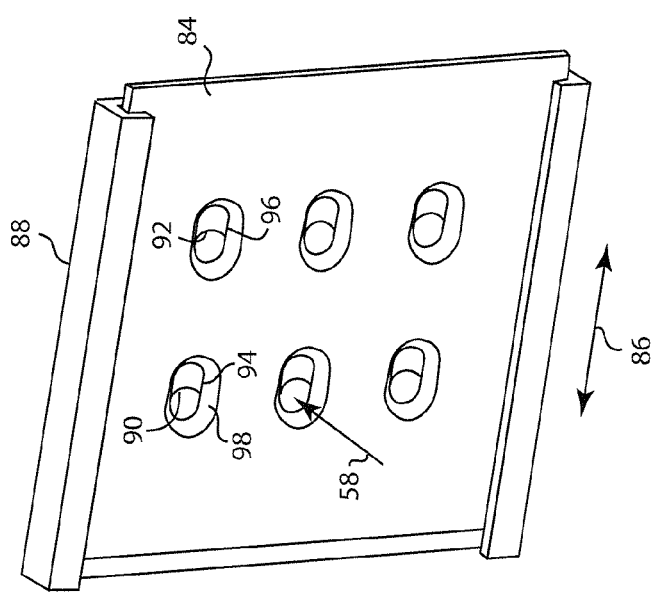
Figure 5:
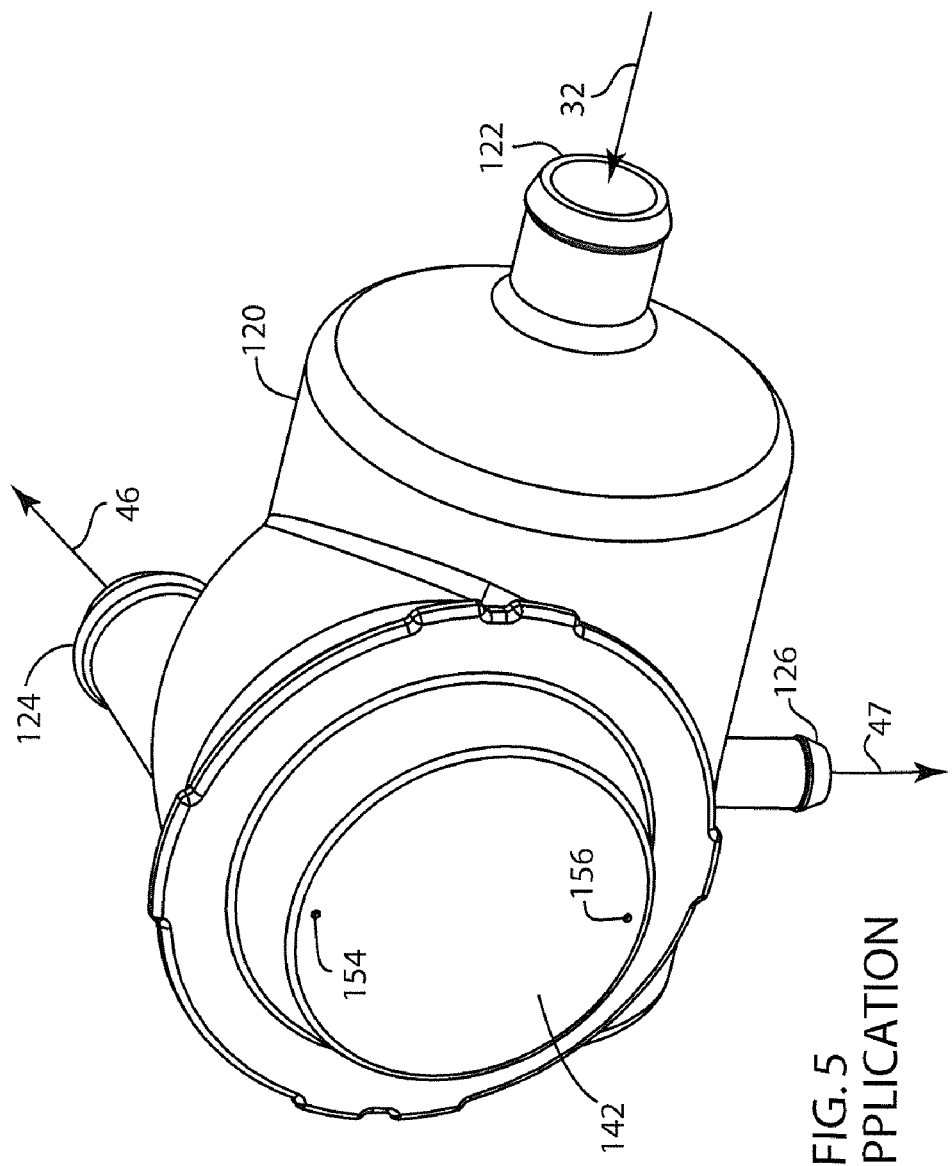
Figure 6:
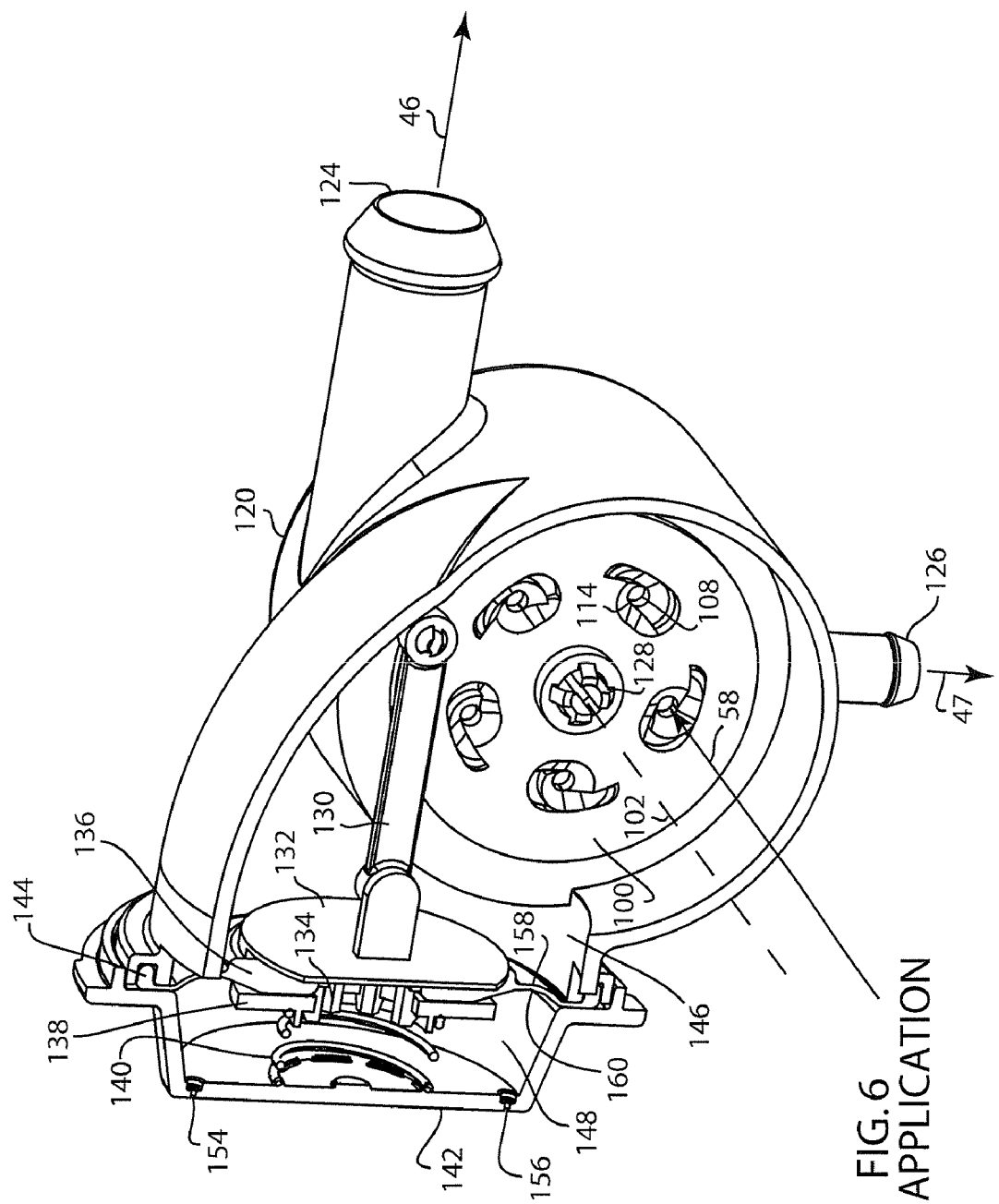
Figure 7:
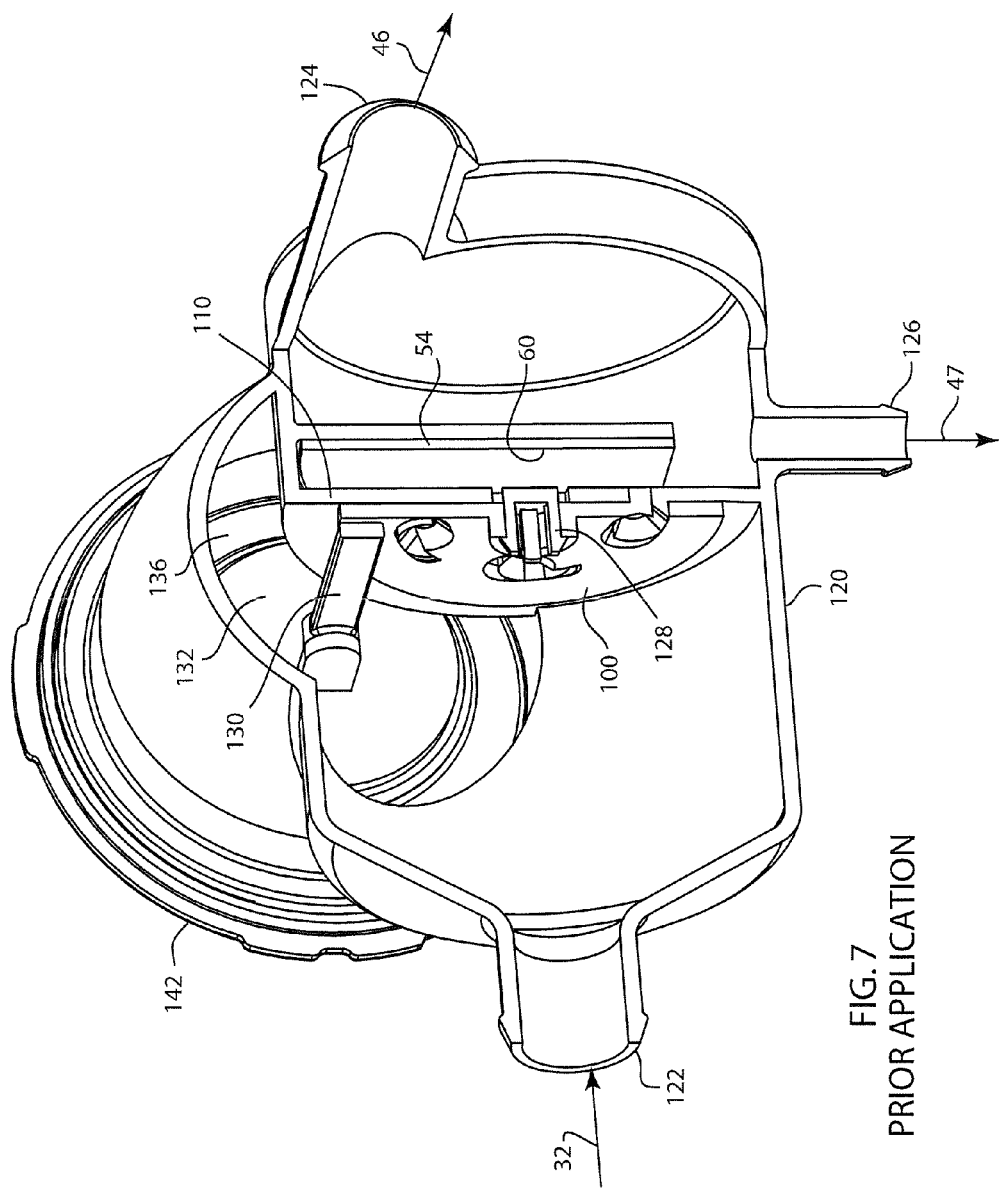
Figure 8:
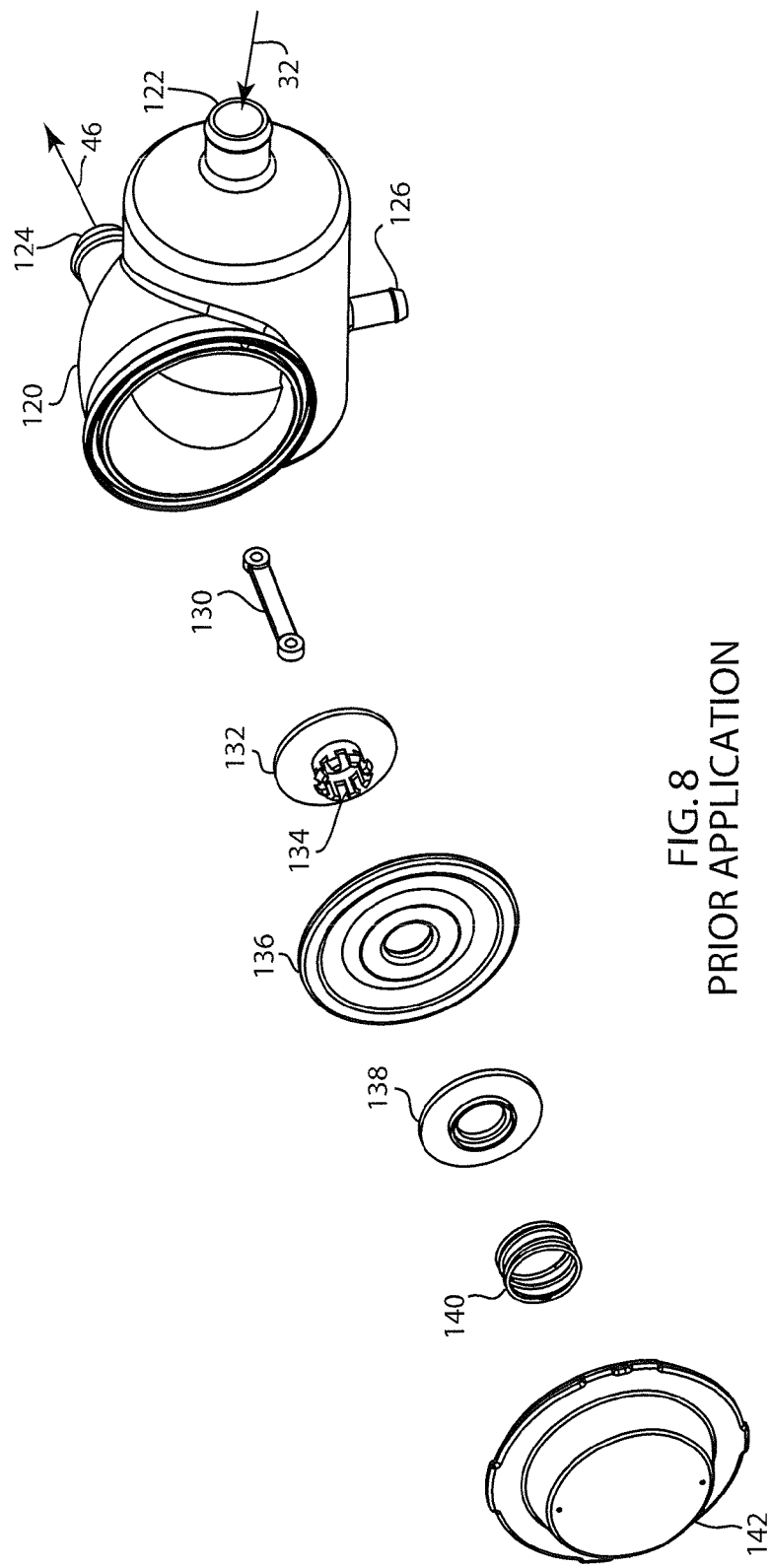

FIG. 3 shows a further embodiment having an actuator plate or disk 84 translationally slidable left-right as shown at arrow 86 along housing 88 to vary the size of nozzle orifices such as 90, 92, as elongated slots or openings 94, 96 of disk 84 moved therealong. Slots or openings 94, 96 may have a frustoconical taper 98 to enhance the noted venturi acceleration effect. As disk 84 moves leftwardly in FIG. 3, the size of venturi orifices 90, 92 increases, i.e. leftward movement of actuator disk 84 expands the size of orifices 90, 92 along a cross-sectional area thereof transverse to axial flow direction 58, to vary the size of the orifices. Rightward movement of actuator disk 84 restricts orifices 90, 92 along the cross-sectional area thereof transverse to axial flow direction 58. Alternatively, or additionally, leftward movement of actuator disk 84 may open additional orifices, and rightward movement of actuator disk 84 may close some orifices, to vary the number of orifices through which the gas-liquid stream flows.

Figure 4:
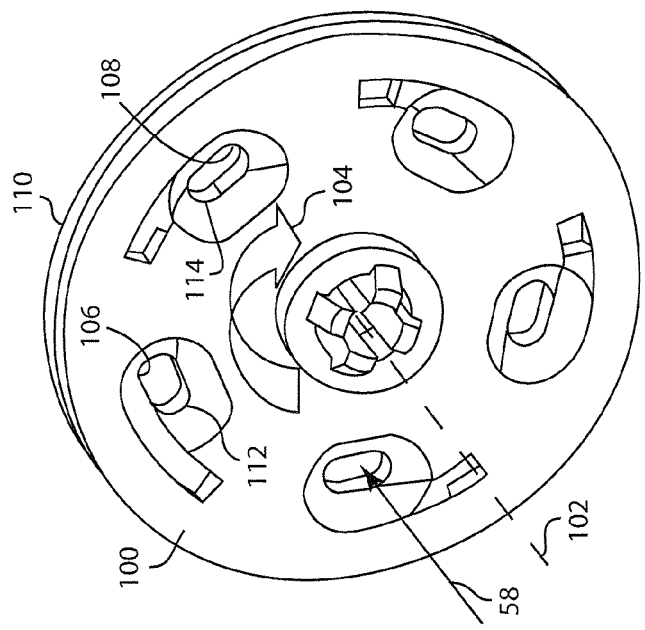

FIG. 4 shows another embodiment having an actuator disk 100 rotatable about a rotation axis 102 parallel to axial flow direction 58. Actuator disk 100 is rotatable clockwise as shown at arrow 104 about axis 102 to restrict and/or close one or more nozzle orifices 106, 108, etc., of housing wall 110, as slots 112, 114 in actuator disk 100 slide transversely thereacross.

FIGS. 5-10 show a preferred implementation of the embodiment of FIG. 4. Housing 120 has an inlet 122, comparable to inlet 42, FIG. 1, for receiving the gas-liquid stream 32, e.g. from crankcase 36. Housing 120 has an outlet 124, comparable to outlet 44, FIG. 1, for discharging gas stream 46, e.g. to air intake manifold 38. Housing 120 has a drain 126, comparable to drain 45, FIG. 1, draining separated fluid 47 from impactor collector 54, e.g. returning collected oil droplets at 47 to crankcase 36. Actuator disk 100 is rotationally mounted to housing spindle 128 to rotate about axis 102. Disk 100 is connected by link 130 to diaphragm plate 132 having legs 134 extending through diaphragm 136 and mounted on the opposite side to spring plate 138, such that diaphragm 136 is sandwiched between plates 132 and 138. Biasing spring 140 bears between spring plate 138 and closure cap 142 mounted to the housing and sealed thereto at perimeter 144 and providing a first chamber 146 on one side of the diaphragm, and a second chamber 148 on the other side of the diaphragm.

Figure 9:
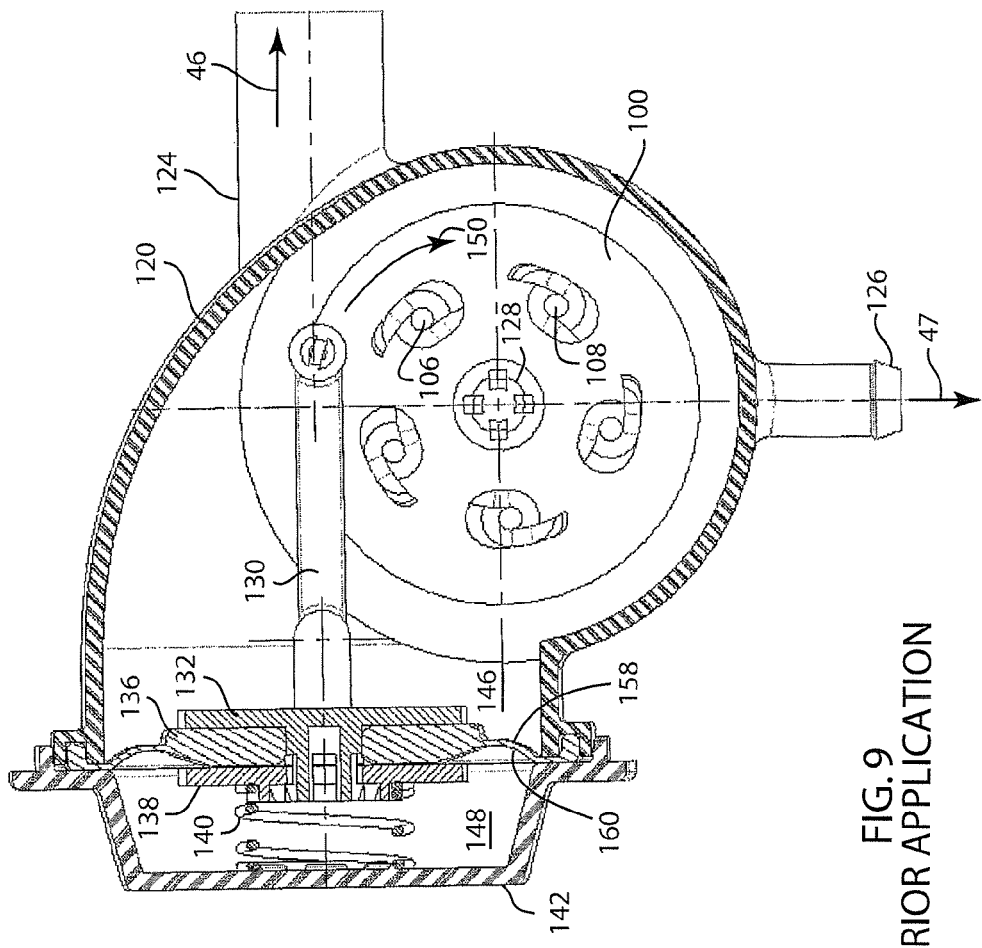
Figure 10:
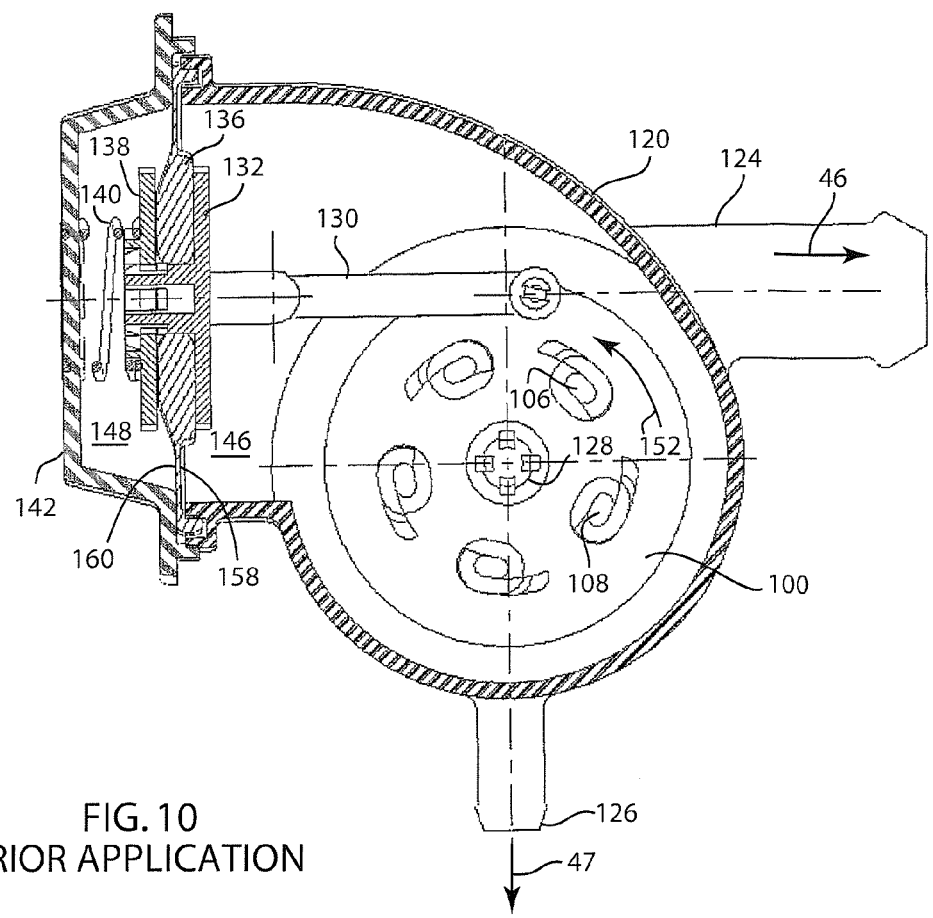

FIG. 9 shows a low pressure condition of the gas-liquid flow stream 32, with actuator disk 100 rotated clockwise as shown at arrow 150 to a first position minimizing cumulative flow through the plurality of nozzle orifices 106, 108, etc., for example restricting the size of one or more such orifices and/or closing one or more of such orifices. FIG. 10 shows a higher pressure condition of gas-liquid flow stream 32, with actuator disk 100 rotated counterclockwise as shown at arrow 152 to a second position maximizing cumulative flow through the plurality of nozzle orifices 106, 108, etc., e.g. by expanding one or more of such orifices and/or opening one or more of such orifices. The actuator has a plurality of positions between its minimum and maximum cumulative flow positions in response to pressure of the gas-liquid stream to maintain the pressure constant, i.e. maintain a constant ΔP relative to a given reference. The given reference may be atmospheric pressure, for example as provided by one or more vent openings 154, 156 in end cap 142 communicating with chamber 148.

In the embodiment of FIGS. 5-10, the noted pressure sensor is provided by diaphragm 136 having first and second opposite sides 158 and 160, with the first side 158 coupled through plate 132 and link 130 to actuator disk 100, comparably to diaphragm 70, FIG. 1, having first and second opposite sides 69 and 71, with first side 69 coupled through link 72 to actuator disk 62. One of the first and second sides of the diaphragm is exposed to pressure in the gas-liquid stream 32 to control movement of the actuator. In FIGS. 1 and 9, the noted first side 69, 158 of the respective diaphragm 70, 136 is exposed to pressure in the gas-liquid stream to control movement of the actuator. In other embodiments, to be described, the second side of the diaphragm is exposed to pressure in the gas-liquid stream to control movement of the actuator. In FIGS. 1-2 and 5-10, the biasing member 76, 140 is overcome by a given pressure in gas-liquid stream 32 in respective chamber 74, 146 on respective first side 69, 158 of respective diaphragm 70, 136.

Figure 11:
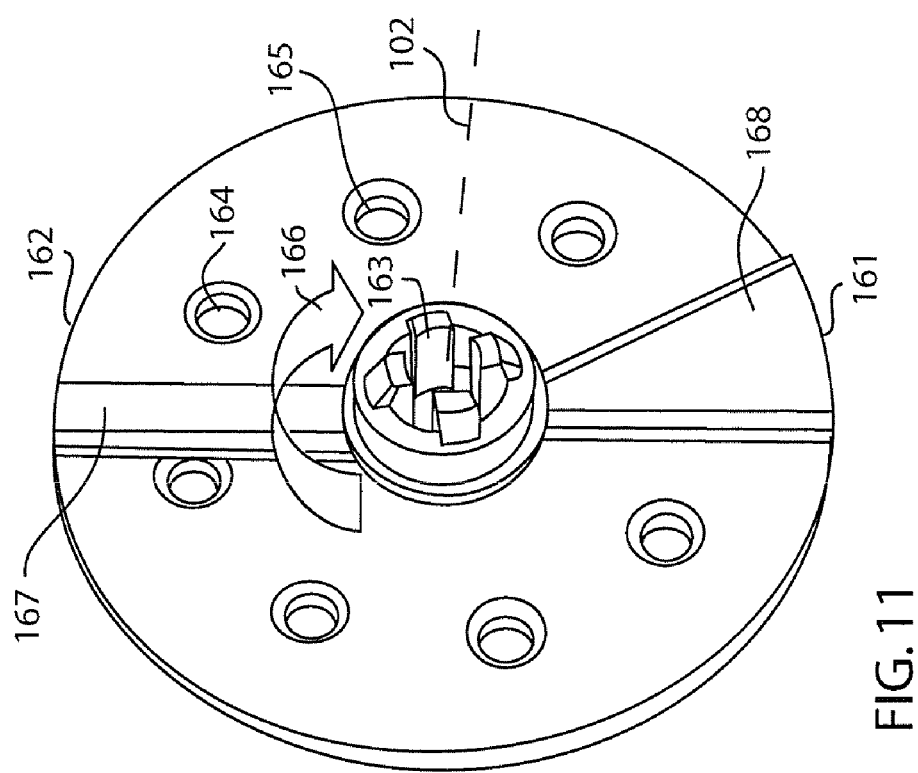

FIG. 11 shows another embodiment having an actuator disk 161 rotatable about rotation axis 102 parallel to axial flow direction 58. Actuator disk 161 is rotationally mounted on housing plate 162 at spindle 163 and is rotational to open or close one or more nozzle orifices such as 164, 165, etc. Upon rotation of disk 161 as shown at arrow 166, one or more radial arms 167, 168 of the disk, which may have differing arcuate lengths, open or close respective nozzle orifices, to thus vary the noted cumulative flow through the nozzle structure by varying the number of nozzle orifices available for flow therethrough.

Figure 12:
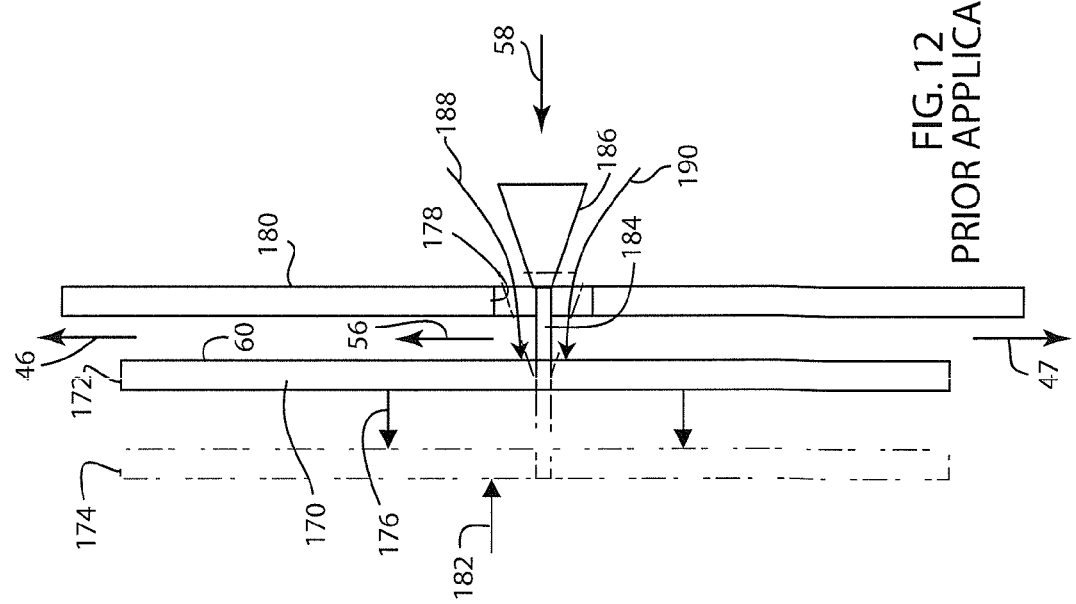

FIG. 12 shows another embodiment having an actuator disk 170 translational along a direction parallel to axial flow direction 58. Actuator 170 is movable from solid line position 172 to dashed line position 174 along arrow 176 in the same direction as axial flow direction 58 to decrease the noted cumulative flow of the gas-liquid stream by restricting or closing nozzle orifices such 178 in housing wall 180. Actuator 170 is movable from dashed line position 174 to solid line position 172 as shown at arrow 182 in the opposite direction to axial flow direction 58, to increase the noted cumulative flow. The actuator includes valve stems such as 184 having respective conically shaped valve heads such as 186 engageable with respective valve seats provided by the nozzle orifices such as 178. The valve head 186 is conically shaped along a taper which narrows toward a direction pointing in the same direction as axial flow direction 58. The valve seats may be conically shaped complementally to the valve heads. In an open valve condition as shown in solid line at 172, the gas-liquid stream flows as shown at 188, 190 through nozzle orifice 178 and strikes impaction surface 60, which may be the facing surface of actuator 170 or may be provided by an impactor collector such as 54 mounted thereto, causing liquid particle separation as above.

FIGS. 13-18 show a preferred implementation of the embodiment of FIG. 12. Housing 200 has an inlet 202, comparable to inlet 42, FIG. 1, for receiving the gas-liquid stream 32, e.g. from crankcase 36. Housing 200 has an outlet 204, comparable to outlet 44, FIG. 1, for discharging gas stream 46, e.g. to air intake manifold 38. Housing 200 has a drain 206, comparable to drain 45, FIG. 1, draining separated fluid 47 from impactor collector 54, e.g. returning collected oil droplets at 47 to crankcase 36. Inner housing wall 180 has a plurality of nozzle orifices 178, 208, etc. Actuator disk 170 has a plurality of valve stems 184, 210, etc. having respective valve heads 186, 212, etc. opening and closing and/or restricting and expanding respective nozzle orifices 178, 208, etc. Actuator disk 170 is mounted on diaphragm 214 which is sealed at its periphery 216 in the housing. The housing includes a chamber 218 receiving the gas-liquid stream from inlet 202, a subchamber 220 between inner housing wall 180 and first side 222 of diaphragm 214, and a chamber 224 on the second side 226 of the diaphragm. The housing is closed by a first closure cap 228 enclosing chamber 218, and a second closure cap 230 enclosing chamber 224.

Figure 13:
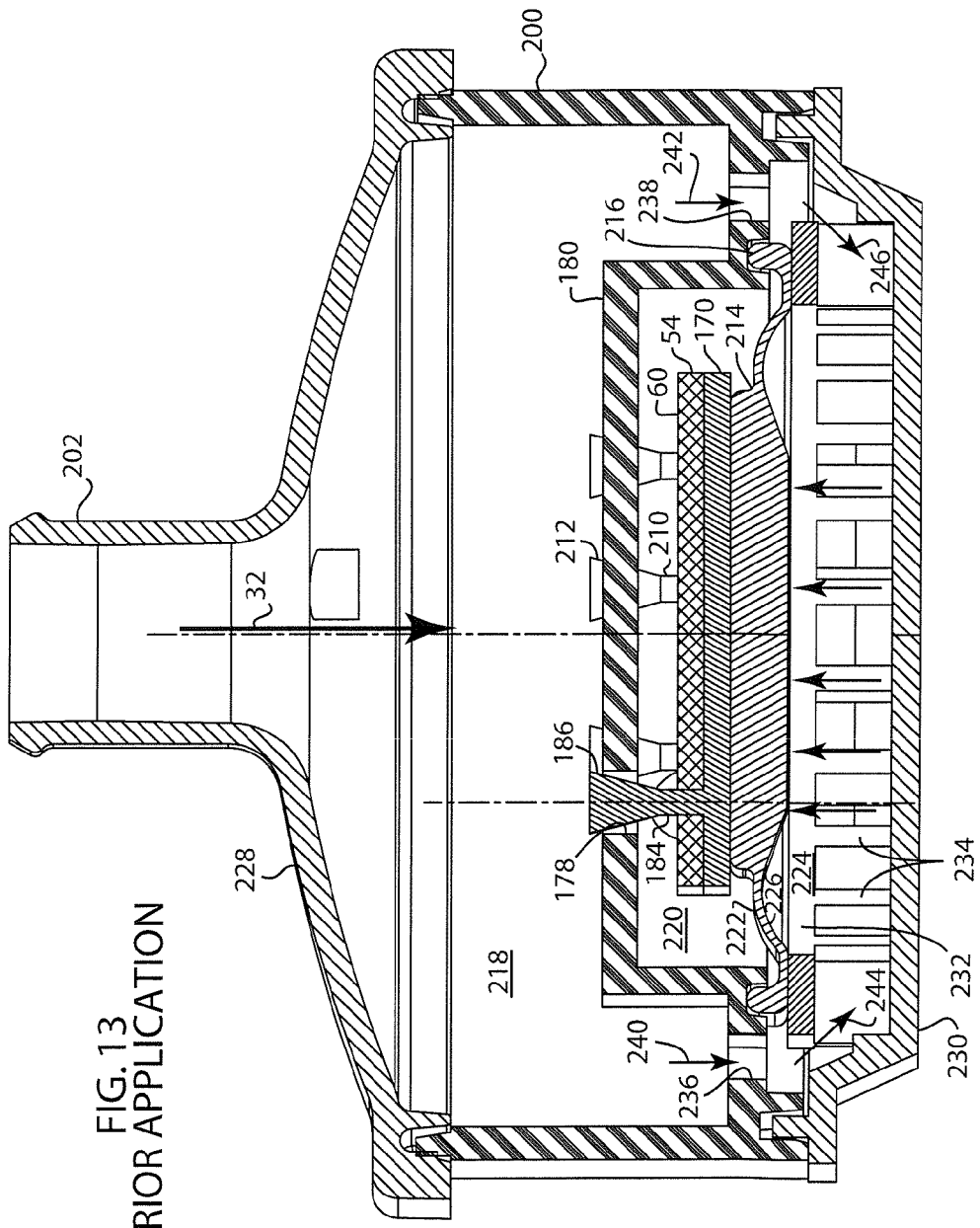

The gas-liquid stream 32 flows through housing inlet 202 into chamber 218 between closure cap 228 and inner housing wall 180. Subchamber 220 is between inner housing wall 180 and diaphragm 214 and receives the gas-liquid flow stream communicated through nozzle orifices 178, 208, etc., when open. Chamber 224 is between closure cap 230 and the noted second side 226 of diaphragm 214 and includes a spacer ring 232 having a plurality of spacer legs 234 for providing a plenum in chamber 224. A plurality of communication passages 236, 238, etc. provide communication of gas-liquid flow stream pressure therethrough as shown at arrows 240, 242, etc. from chamber 218 into chamber 224 as shown at arrows 244, 246, etc. The size and number of communication passages 236, 238, etc. are selected such that the ratio of pressure on second side 226 of diaphragm 214 resulting from and relative to the pressure of the gas-liquid stream is greater than the ratio of the pressure on first side 222 of diaphragm 214 relative to and resulting from the pressure of the gas-liquid stream. Diaphragm 214 is inherently biased, or alternatively has a non-stretched position, as shown in FIG. 13, with nozzle orifices 178, 208, etc. closed by valve heads 186, 212, etc., which is the dashed line position 174 shown in FIG. 12. This inherent bias or non-stretched position of the diaphragm has a bias toward such closed position of the nozzle orifices which is greater than the pressure in chamber 224 on second side 226 of the diaphragm, e.g. at low engine speed. As the pressure of the gas-liquid stream increases, the pressure in chamber 224 on second side 226 of the diaphragm increases and overcomes the inherent bias of diaphragm 214 to stretch and move the diaphragm to the position shown in FIG. 14, which is the solid line position 172 in FIG. 12, to begin to open nozzle orifices 178, 208, by moving valve heads 186, 212, etc. away from their respective valve seats along direction 182, FIG. 12. This opening movement of the valves is opposed and counterbalanced by the pressure in subchamber 220 on first side 222 of the diaphragm now available due to the gas-liquid stream flow as shown at arrows 188, 190 through the respective nozzle orifices into subchamber 220. The noted ratio of pressures on the first and second sides of the diaphragm control the opening and closing of the valves, and vary the size of the nozzle orifices, and if desired the number of orifices opened or closed.

The cumulative flow through the nozzles is varied by variable flow actuator 170 wherein movement of such actuator varies at least one of the size and number of orifices 178, 208, etc. The cumulative flow may further be varied by varying: the axial height of valve stems 184, 210, etc. stem-to-stem; the taper, width, etc. of valve heads 186, 212, etc. from head-to-head; the size of the orifices 178, 208, etc.; the pressure ratio on opposite sides 222 and 226 of the diaphragm by varying the size and number of communication passages 236, 238; and various combinations thereof.

Figure 14:
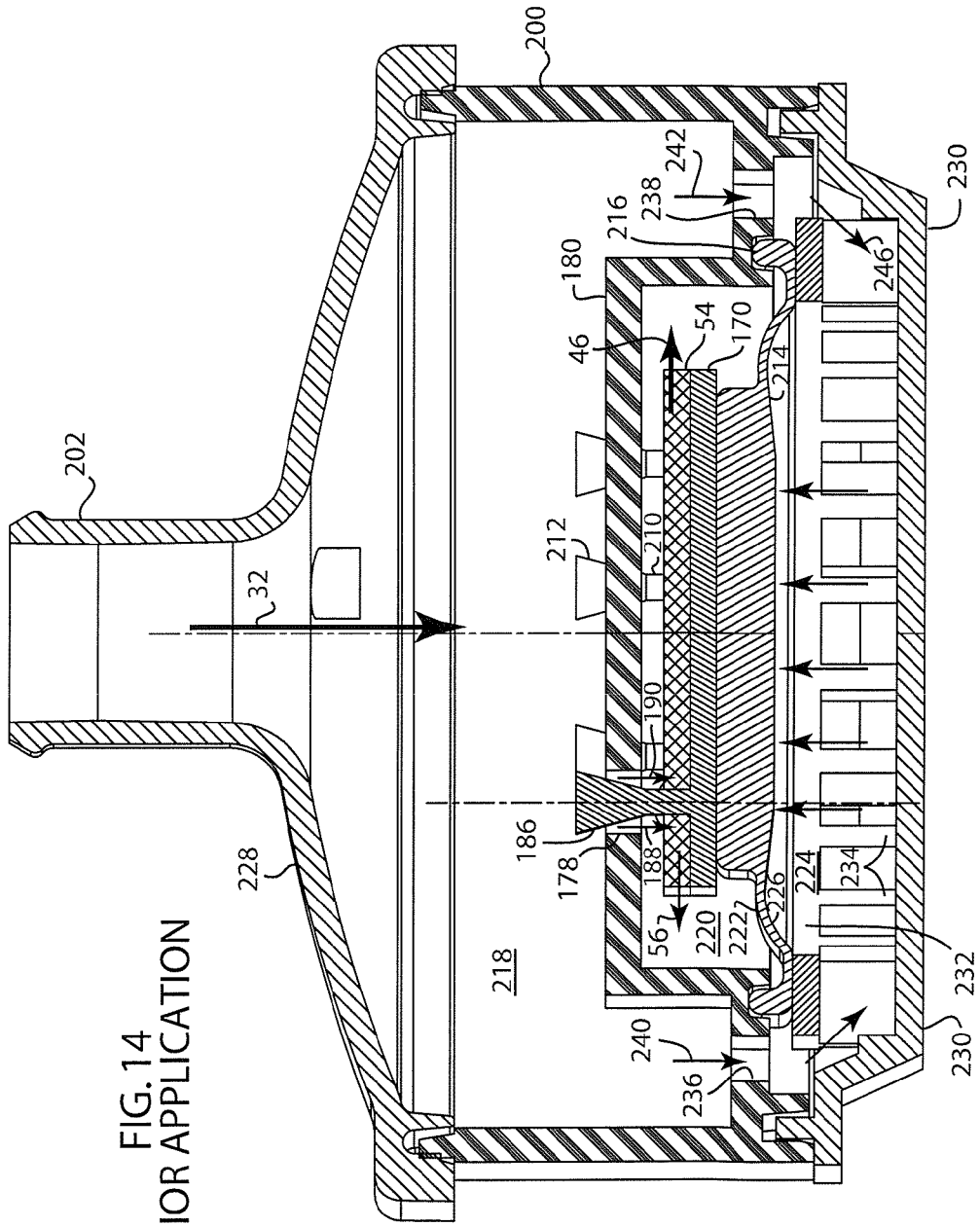
Figure 15:
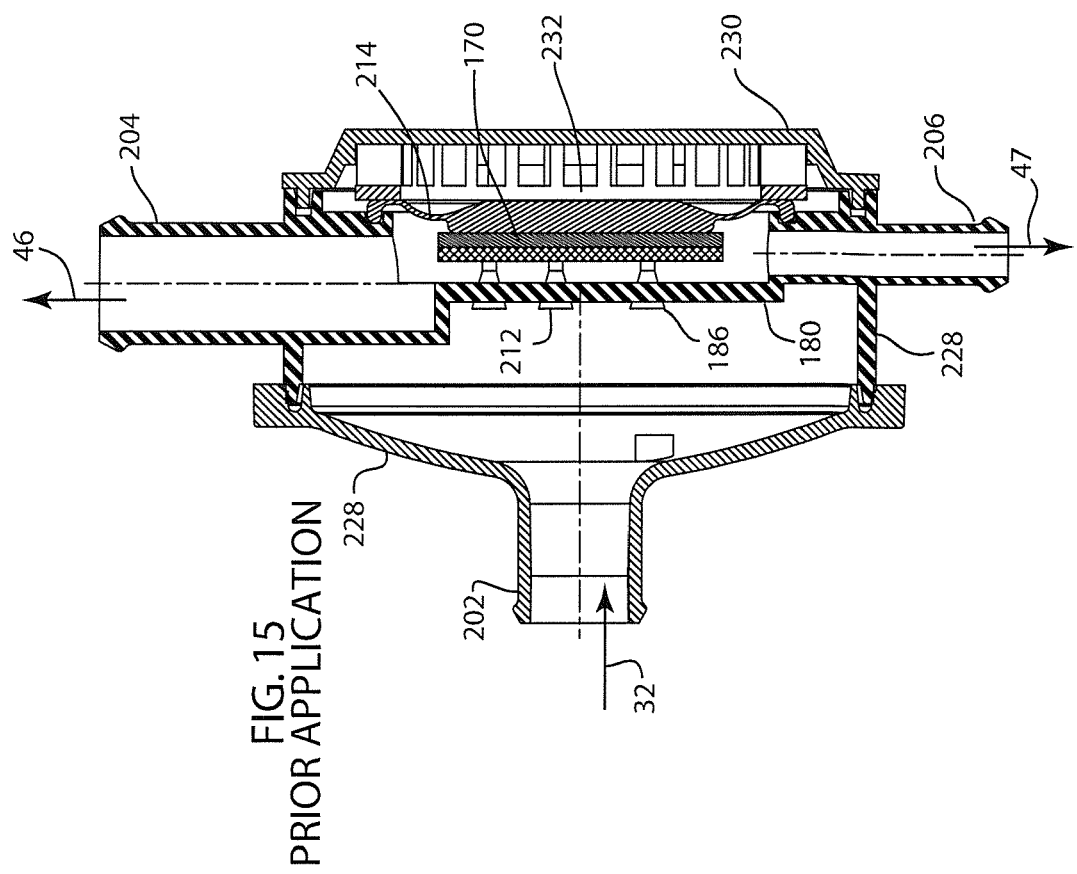
Figure 16:
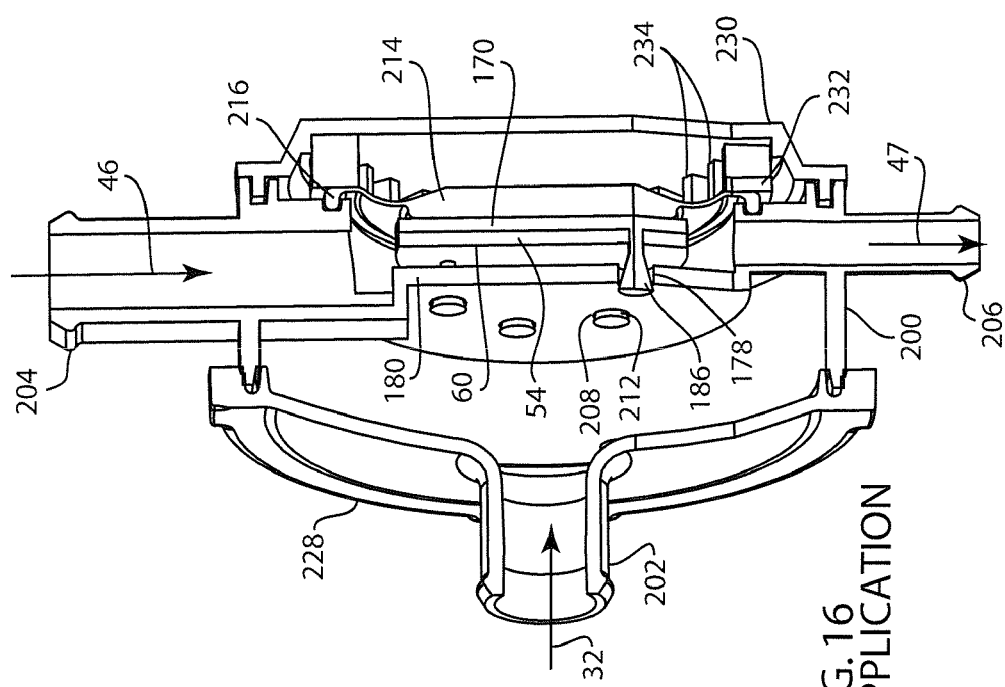
Figure 17:
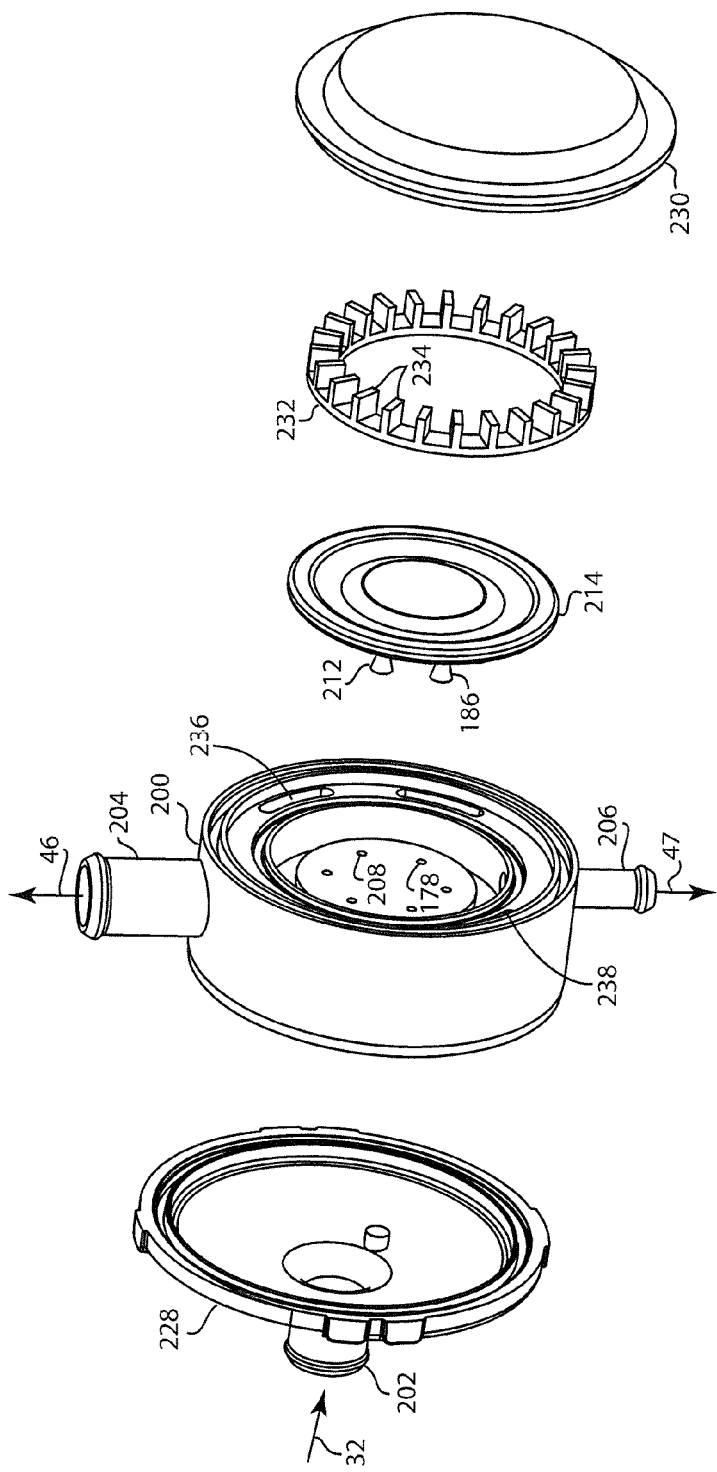
Figure 18:
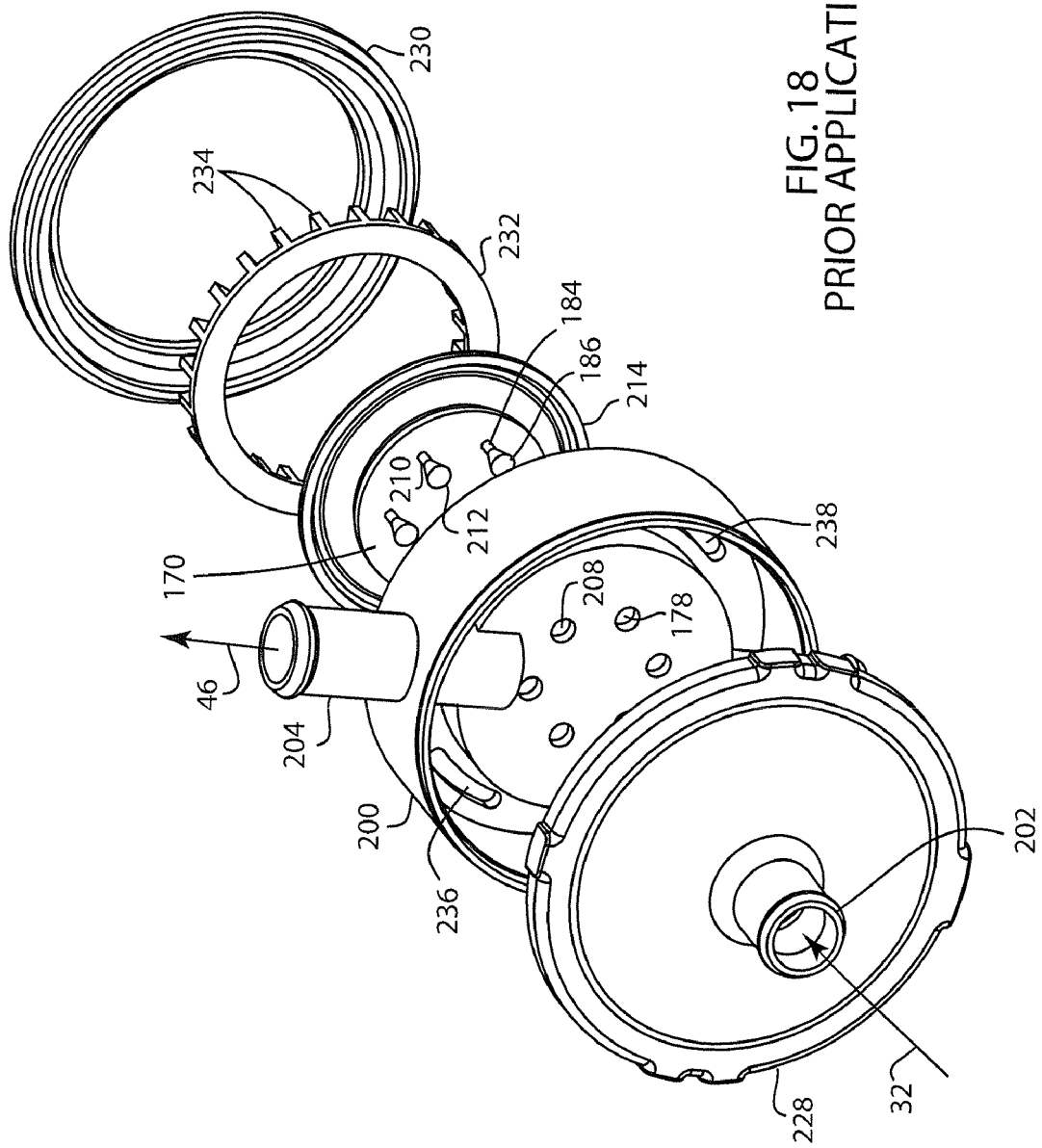

Actuator 170 has a first position as shown in FIG. 13 and in dashed line 174 in FIG. 12, minimizing or closingly stopping cumulative flow of the gas-liquid stream through the plurality of nozzle orifices 178, 208. The actuator has a second position as shown in FIG. 14 and in solid line 172 in FIG. 12, maximizing cumulative flow through the plurality of nozzle orifices 178, 208, etc. Actuator 170 is moved by the pressure sensor provided by diaphragm 214 between the noted first and second positions and a plurality of positions therebetween in response to pressure of the gas-liquid stream to maintain such pressure constant, i.e. maintain a constant ΔP if desired. As above, this overcomes prior trade-offs in a fixed separator which is non-adaptive to changing engine or flow conditions nor different engine sizes. Side 226 of the diaphragm is exposed to pressure in the gas-liquid stream in both of the noted first and second positions of the actuator and the intermediate positions therebetween. Side 222 of the diaphragm is exposed to pressure in the gas-liquid stream in the noted second position and intermediate positions of the actuator.

Figure 19:
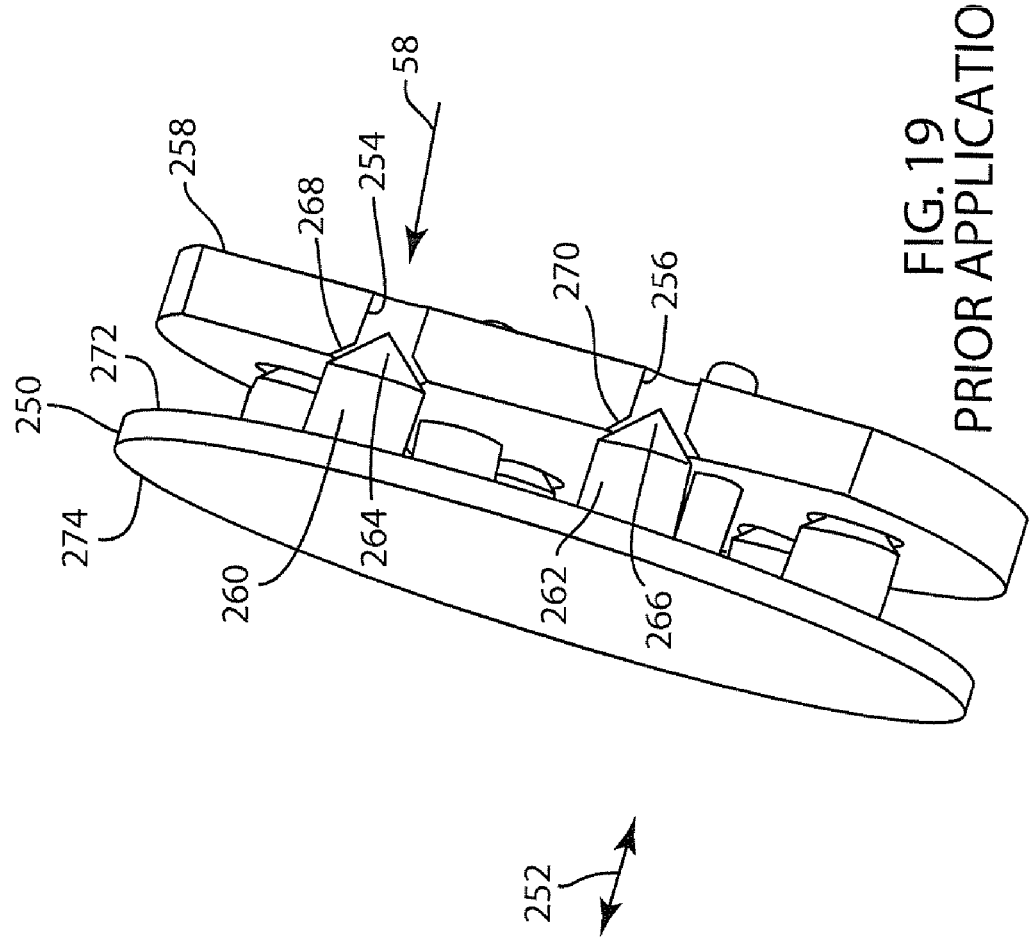

FIG. 19 shows a further embodiment, with an actuator 250 translational along a direction 252 parallel to axial flow direction 58, comparably to actuator 170, FIG. 12, for opening and closing, and/or enlarging and restricting nozzle orifices such as 254, 256, etc. in housing wall 258. Actuator 250 has a plurality of valve stems 260, 262, etc. having conically shaped valve heads 264, 266, etc., engageable with respective valve seats such as 268, 270, etc. which valve seats may be conically shaped complementally to the valve heads. Unlike FIG. 12, valve heads 264, 266 in FIG. 19 are conically shaped along a taper which narrows toward a direction pointing opposite to axial flow direction 58. Variable flow actuator 250 varies the cumulative flow of the gas-liquid flow stream through nozzle orifices 254, 256, etc. in response to a given parameter, by moving back and forth as shown at arrow 252. If pressure in the gas-liquid flow stream is the designated parameter, the pressure against valve heads 264, 266 may be used to open the valves, and the pressure against such valve heads and surface 272 of the actuator disk may be used to vary and expand the cumulative flow area by increasing the cross-sectional area of the nozzle orifices. A biasing spring such as 76, 140 may bear against surface 274 of the actuator disk to bias the actuator to a closed or restricted position. Actuator 250 moves in the same direction as axial flow direction 58 to increase the noted cumulative flow, and moves in the opposite direction to axial flow direction 58 to decrease the noted cumulative flow.

FIGS. 20-22 show a further embodiment having a plurality of actuator assemblies 280, 282, 284, 286 in housing 290. In actuator assembly 280, housing sub-wall 292 has a plurality of nozzle orifices such as 294, 296, 298, etc. through which the gas-liquid flow stream at 58 is accelerated and strikes inertial impactor collector 54 at impaction surface 60, as above, causing liquid particle separation from the gas-liquid stream. Impactor collector 54 is mounted on variable flow actuator 300, or alternatively face surface 302 of the actuator may provide the impaction surface 60. Actuator 300 is translational back and forth as shown at arrow 304 along a direction parallel to axial flow direction 58, and is biased to a closed position (upwardly in FIG. 22), by a spring 306 bearing between underside 308 of actuator disk 300 and a spring seat 310 of the housing. In the upwardly biased closed position shown in FIG. 22, an annular gasket 312 on the outer circumference of actuator disk 300 engages the lower apex of V-shaped valve seat 314 of the housing in sealing relation to block gas stream and liquid stream flow therepast. Actuator 300 is movable in a second direction (downwardly in FIG. 22) to a second open position wherein gasket 312 is moved downwardly away from and disengaged from valve seat 314 by a gap therebetween to permit gas stream flow therepast to the housing outlet, shown schematically at 44 in FIG. 22, and to permit liquid stream flow therepast to the housing drain, shown schematically at 45 in FIG. 22. The remaining actuator assemblies 282, 284, 286 are the same.

The inertial impactor collector of the above embodiments of FIGS. 1-19 is provided in FIGS. 20-22 as a plurality of impaction surfaces 60, 60a, 60b, 60c each receiving the gas-liquid stream through a respective set of one or more orifices 294, 296, 298, etc. The variable flow actuator is provided by a plurality of impaction buttons 300, 300a, 300b, 300c each carrying a respective impaction surface 60, 60a, 60b, 60c. Each impaction button is movable between the noted closed and open positions independently of the other impaction buttons. The noted cumulative flow of the gas-liquid stream at 58 is varied by varying the number of impaction buttons in at least one of the closed and open positions. For example, cumulative flow may be increased by opening one or more of the impaction buttons, and decreased by closing one or more impaction buttons. The impaction buttons are spring biased at different spring rates, to provide differential sequential opening and closing thereof. For example, each of springs 306, 306a, 306b, 306c has a different spring rate, such that, for example, impaction button 300 opens first in response to increasing pressure, and then impaction button 300a opens in response to further increasing pressure, and then impaction button 300b opens in response to yet further increasing pressure, and so on. Impaction buttons 300, 300a, 300b, 300c are translational along a direction parallel to axial flow direction 58, and are biased to the noted closed position (upwardly in FIG. 20) along the noted direction parallel to axial flow direction 58.

Referring to FIG. 1, gas-liquid stream 32 becomes gas stream 46 and flows from upstream to downstream through the housing from inlet 42 then through nozzle orifices 50, 52, etc. then to inertial impactor collector 54 at impaction surface 60 then to outlet 44. In the embodiments of FIGS. 1-19, the noted actuator is upstream of the inertial impactor collector. In the embodiment of FIGS. 20-22, the actuator is downstream of the inertial impactor collector.

Figure 23:
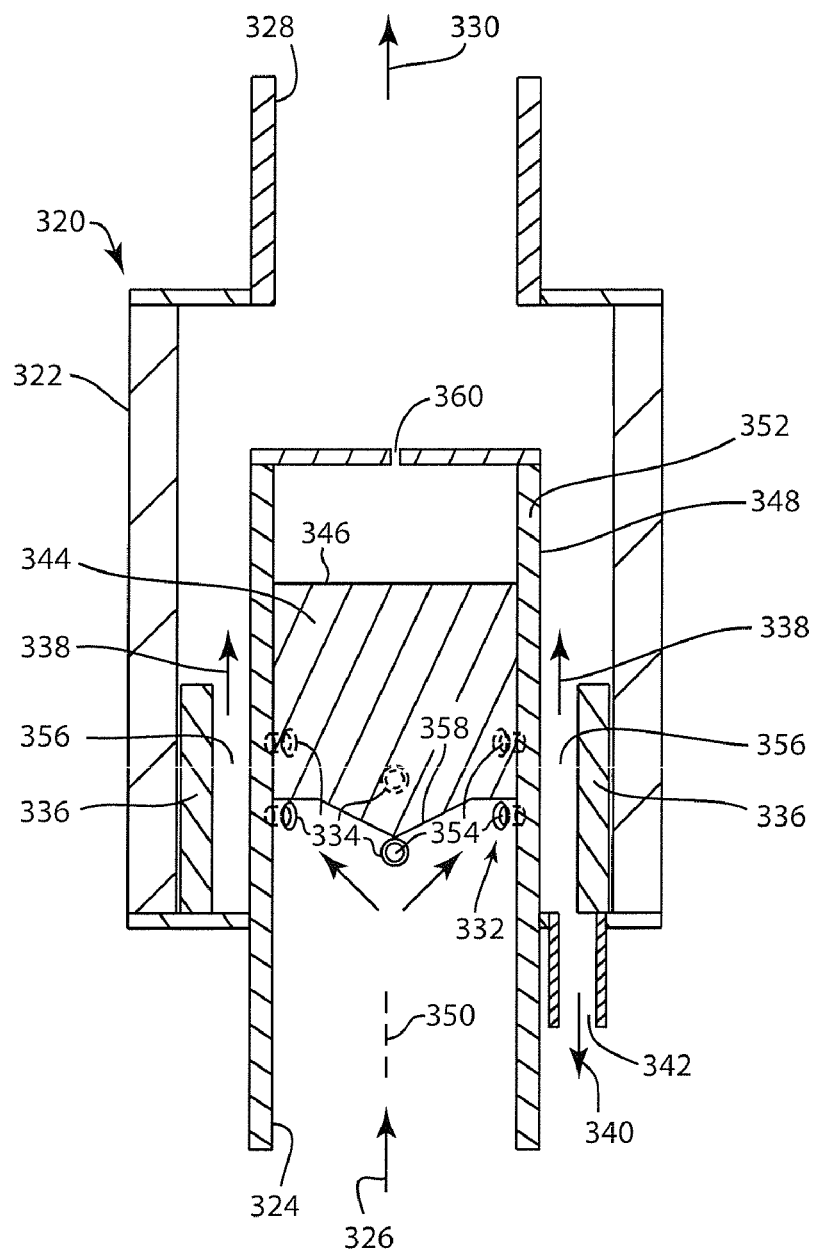

FIG. 23 shows an inertial gas-liquid separator 320 for removing liquid particles from a gas-liquid stream. A housing 322 has an inlet 324 for receiving a gas-liquid stream 326, and an outlet 328 for discharging a gas stream 330. Nozzle structure 332 in the housing includes a plurality of nozzles such as 334 receiving the gas-liquid stream from inlet 324 and accelerating the gas-liquid stream through the nozzles. An inertial impactor collector 336 is provided in the housing in the path of the accelerated gas-liquid stream and causes liquid particle separation from the gas-liquid stream, followed by flow of the gas stream as shown at 338, and drainage of liquid 340 at drain 342. A variable flow actuator 344 is movable, e.g. up and down in FIG. 23, to open and close a variable number of nozzles 334.

Variable flow actuator 344 is responsive to pressure of gas-liquid stream 326. The variable flow actuator responds to increasing pressure by moving, e.g. upwardly in FIG. 23, to open more of nozzles 334. The variable flow actuator responds to decreasing pressure to close more of nozzles 334, e.g. by moving downwardly in FIG. 23. In this manner, a substantially constant pressure drop is maintained across inertial gas-liquid separator 320 between inlet 324 and outlet 328 notwithstanding changing flow conditions of the gas-liquid stream therethrough. It is preferred that the distance between nozzles 334 and inertial compactor collector 336 be constant and unchanged by movement of variable flow actuator 344.

In FIG. 23, variable flow actuator 344 is provided by a piston 346 axially slidable along a cylinder 348 extending along an axis 350. The cylinder has cylinder wall 352 with a plurality of apertures 354 therethrough providing the noted plurality of nozzles. The apertures are covered and uncovered by piston 346 during sliding of the piston along the cylinder to respectively close and open the nozzles. Inertial impactor 336 is an annular member spaced radially outwardly of cylinder 348 by an annular acceleration gap 356 therebetween. Apertures 354 extend radially through cylinder wall 352. Gas-liquid stream 326 flows axially within cylinder 348 and then radially outwardly through apertures 354 uncovered by piston 346 and is accelerated into annular acceleration gap 356 and impact inertial impactor collector 336 causing liquid particle separation from the gas-liquid stream. Gas-liquid stream 326 flows in a given axial direction within cylinder 348, e.g. upwardly in FIG. 23. After the noted separation, the gas stream at 338 flows in the same given axial direction along the exterior of cylinder 348. The gas-liquid stream flows through inlet 324 in the noted given axial direction. The gas stream at 330 flows through outlet 328 in the same noted given axial direction.

Piston 346 has a leading surface 358 facing the incoming flow of the gas-liquid stream 326 thereagainst. Leading surface 358 is configured to directionally guide and direct flow to apertures 354 in cylinder wall 352. In one embodiment, such directional configuration is a cone shape or a convex shape or a channeled guide surface, etc.

In the embodiment of FIG. 23, piston 346 is a gravimetric piston relying on the weight of the piston to regulate flow. The noted axis of movement is vertical. Piston 346 has the noted bottom face 358 facing downwardly and receiving the incoming flow of the gas-liquid stream 326 thereagainst. Piston 346 slides upwardly in cylinder 348 in response to increasing pressure of the gas-liquid stream 326 to open up more of apertures 354. The piston slides downwardly in the cylinder in response to decreasing pressure of the gas-liquid stream 326 to close off more of apertures 354. The top of the cylinder includes a vent hole 360 to avoid creation of a vacuum within the cylinder during piston movement, so as not to impede movement of the piston.

Figure 24:
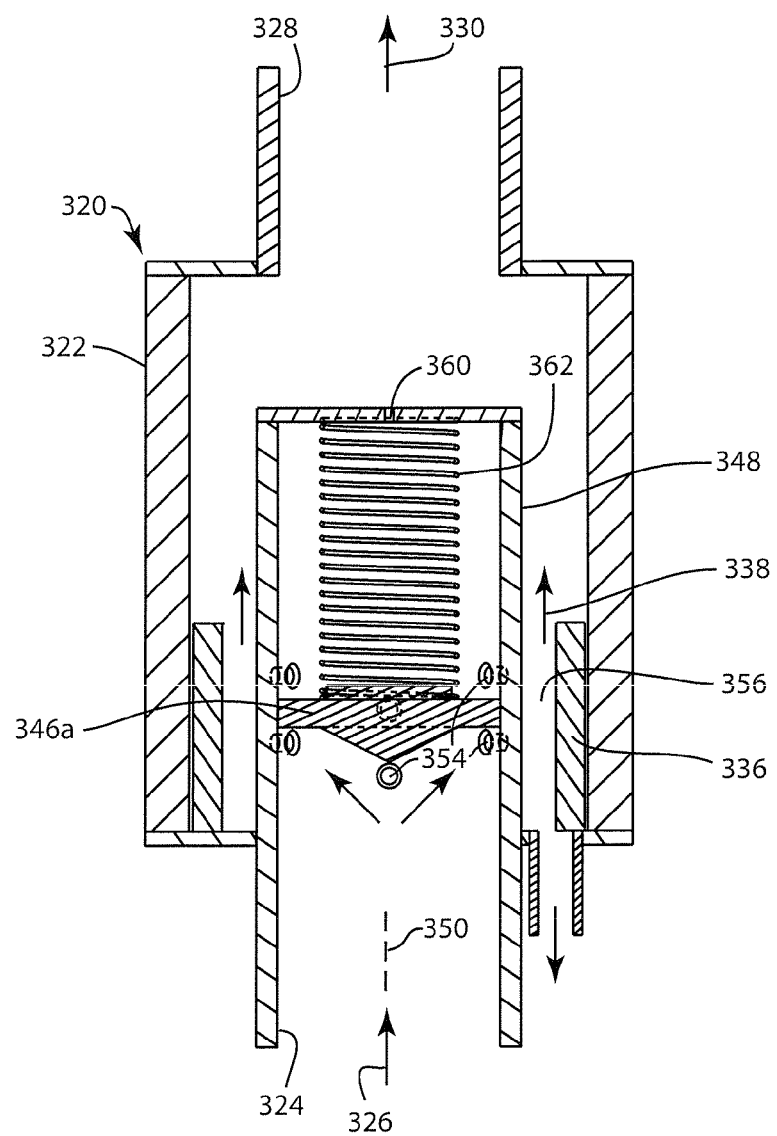

FIG. 24 shows another embodiment and uses like reference numerals from above where appropriate to facilitate understanding. A biasing member, such as spring 362, biases piston 346a against the incoming flow of gas-liquid stream 326 thereagainst. Piston 346a slides in a first axial direction, e.g. upwardly in FIG. 24, against the bias of biasing spring 362 in response to increasing pressure of gas-liquid stream 326 to open more of apertures 354. Piston 346a slides in a second opposite direction, e.g. downwardly in FIG. 24, as biased by biasing spring 362 in response to decreasing pressure of gas-liquid stream 326 to close off more of apertures 354.

Figure 25:
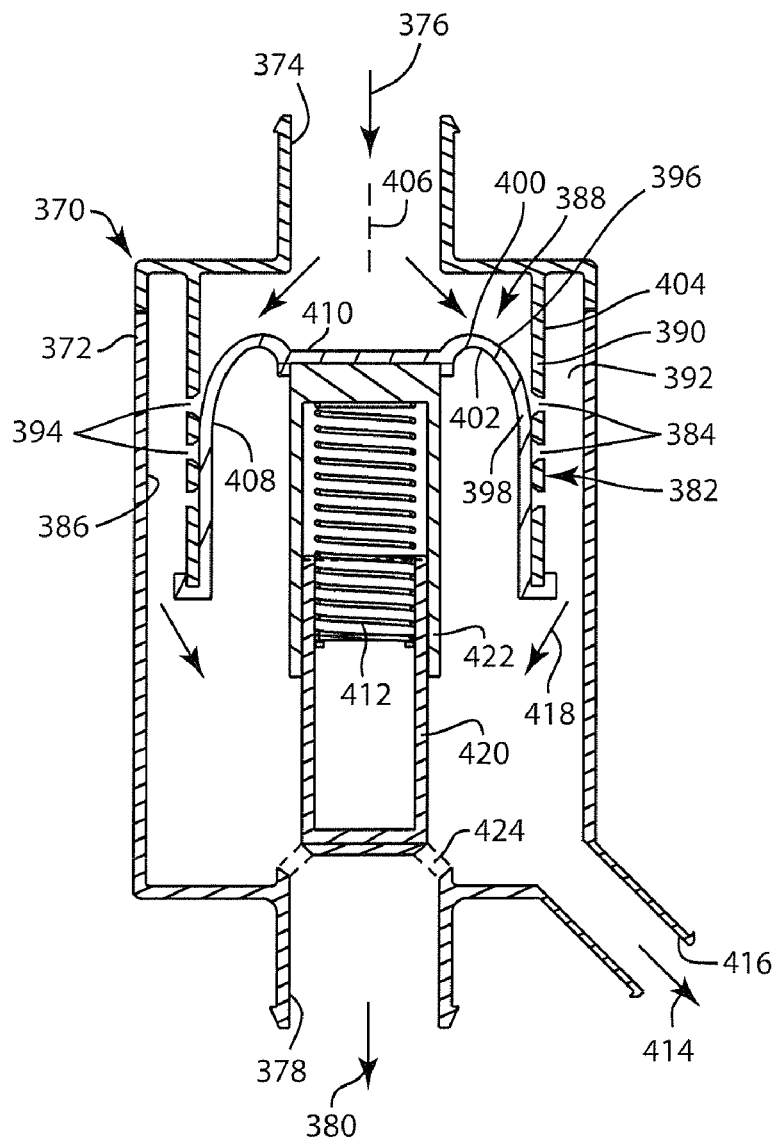

FIG. 25 shows another embodiment of an inertial gas-liquid separator 370 for removing liquid particles from a gas-liquid stream. A housing 372 has an inlet 374 for receiving a gas-liquid stream 376, and has an outlet 378 for discharging a gas stream 380. Nozzle structure 382 in the housing has a plurality of nozzles 384 receiving the gas-liquid stream from inlet 374 and accelerating the gas-liquid stream through the nozzles. An inertial impactor collector 386 is provided in the housing, which may be an interior wall of the housing, in the path of the accelerated gas-liquid stream. A variable flow actuator 388 in the housing is movable to open and close a variable number of nozzles 384.

Housing 372 has a wall 390 facing inertial impactor collector 386 and separated therefrom by an annular acceleration gap 392 therebetween. Wall 390 has a plurality of apertures 394 therethrough providing the noted nozzles 384. Variable flow actuator 388 is provided by a rolling diaphragm 396 having a resilient flexible region 398 covering and uncovering apertures 394 in a flexing motion to respectively close and open nozzles 384. Diaphragm 396 has a first side 400 communicating with inlet 374 and exposed to the incoming flow of the gas-liquid stream 376. The diaphragm has a second opposite side 402 communicating with outlet 378. First side 400 of the diaphragm has a changing effective area, which effective area is defined as the area exposed to incoming flow. The effective area of the diaphragm increases in response to increasing pressure of gas-liquid stream 376, and the diaphragm uncovers and opens up more of apertures 394. The effective area of the diaphragm decreases in response to decreasing pressure of gas-liquid stream 376, and the diaphragm covers and closes off more of apertures 394. Wall 390 is a cylindrical wall of a cylinder 404 in the housing and extending axially along axis 406. Apertures 394 extend radially through cylinder wall 390. Diaphragm 396 has an outer portion 408 extending axially along the interior of cylinder wall 390 and is flexible radially away therefrom to uncover and open more of the apertures 394. Diaphragm 400 has a central portion 410 spanning radially inwardly from the outer portion and movable in a first axial direction, e.g. downwardly in FIG. 25, to flex outer portion 408 of the diaphragm radially inwardly away from apertures 394 and out of engagement of cylinder wall 390 to uncover and open more of the apertures. Central portion 410 is movable in a second opposite axial direction, e.g. upwardly in FIG. 25, to flex outer portion 408 of the diaphragm radially outwardly toward apertures 394 and into engagement with cylinder wall 390 to cover and close off more of the apertures 394. Biasing spring 412 biases central portion 410 of the diaphragm in the noted second axial direction, e.g. upwardly in FIG. 25, and against the incoming flow of gas-liquid stream 376. The separated liquid drains as shown at arrow 414 at drain 416. The gas stream flows as shown at arrows 418 to outlet 378. A central column 420 supports an upper sleeve 422 in telescopic axial sliding relation which in turn supports upper central portion 410 of the diaphragm. The base of support column 420 has a plurality of slots or apertures 424 passing the gas flow therethrough to outlet 378.

Figure 26:
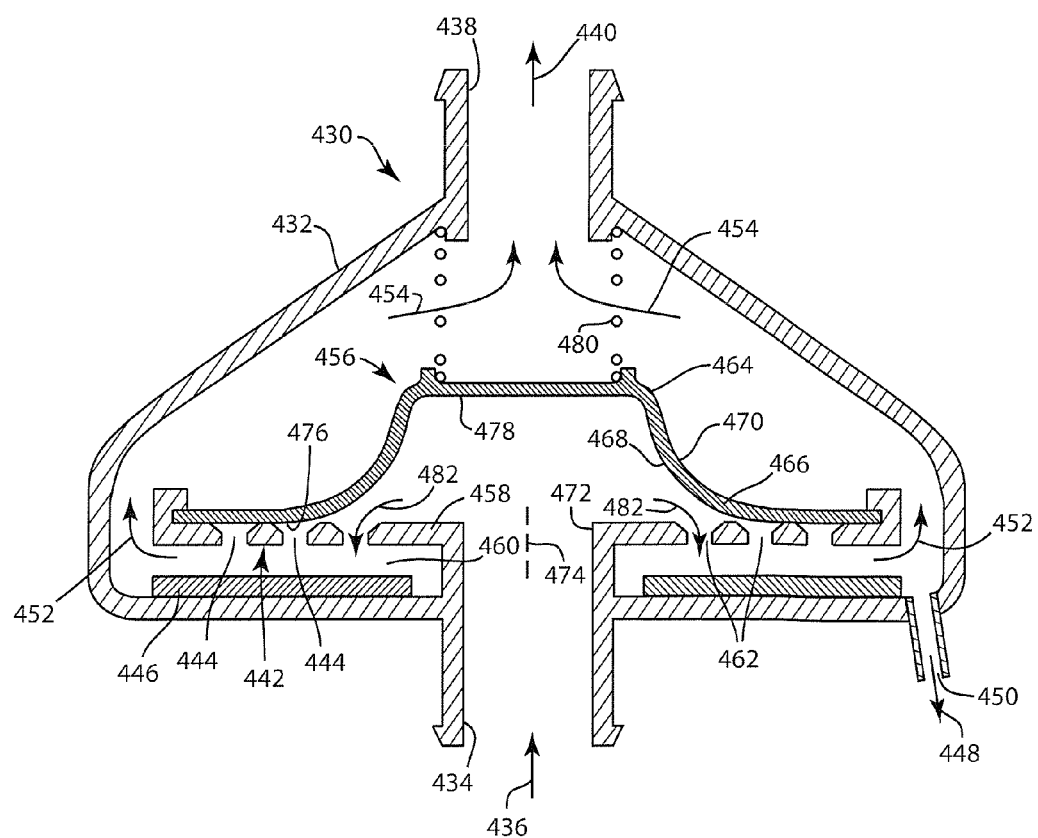

FIG. 26 shows another embodiment of an inertial gas-liquid separator 430 for removing liquid particles from a gas-liquid stream. Housing 432 has an inlet 434 for receiving a gas-liquid stream 436, and has an outlet 438 for discharging a gas stream 440. Nozzle structure 442 in the housing has a plurality of nozzles 444 receiving the gas-liquid stream from inlet 434 and accelerating the gas-liquid stream through nozzles 444. An inertial impactor collector 446 is provided in the housing in the path of the accelerated gas-liquid stream and causes liquid particle separation from the gas-liquid stream. The liquid drains as shown at arrow 448 at drain 450. The gas stream continues as shown at arrows 452, 454 to outlet 438. A variable flow actuator 456 is movable to open and close a variable number of nozzles 444. The housing has a wall 458 facing inertial impactor collector 446 and separated therefrom by an acceleration gap 460 therebetween. Wall 458 has a plurality of apertures 462 therethrough providing the noted nozzles. Variable flow actuator 456 is provided by a rolling diaphragm 464 having a resilient flexible region 466 covering and uncovering apertures 462 in a flexing motion to respectively close and open the nozzles. Diaphragm 464 has a first side 468 communicating with inlet 434 and exposed to the incoming flow of gas-liquid stream 436. The diaphragm has a second opposite side 470 communicating with outlet 438. First side 468 of the diaphragm has a changing effective area, such effective area being defined as the area exposed to incoming flow. The effective area of the diaphragm increases in response to increasing pressure of gas-liquid stream 436, and the diaphragm uncovers and opens more of apertures 462. The effective area of the diaphragm decreases in response to decreasing pressure of gas-liquid stream 436, and the diaphragm covers and closes off more of apertures 462.

Wall 458 is a plate having an incoming flow opening 472 therethrough communicating with inlet 434 and receiving the incoming flow of gas-liquid stream 436. The incoming flow flows axially along axis 474 through opening 472. Plate 458 extends laterally outwardly from opening 472. The plurality of apertures 462 extend axially through plate 458 and are laterally outward of opening 472. Diaphragm 464 has an outer portion 476 extending laterally along plate 458 and flexible axially, e.g. upwardly in FIG. 26, away therefrom to uncover and open up more of apertures 462. Diaphragm 464 has a central portion 478 spanning laterally inwardly from the outer portion and movable in a first axial direction, e.g. upwardly in FIG. 26, to flex outer portion 476 of the diaphragm axially away from apertures 462 and out of engagement of plate 458 to uncover and open up more of apertures 462. Central portion 478 of the diaphragm is movable in a second opposite axial direction, e.g. downwardly in FIG. 26, to flex outer portion 476 of the diaphragm axially toward apertures 462 and into engagement with plate 458 to cover and close off more of apertures 462. A biasing spring 480 biases central portion 478 of the diaphragm in the noted second axial direction, e.g. downwardly in FIG. 26, and against the incoming flow of gas-liquid stream 436. The gas-liquid stream 436 flows through opening 472 in the noted first axial direction, e.g. upwardly in FIG. 26, and then flows as shown at arrows 482 in the noted second axial direction, e.g. downwardly in FIG. 26. The gas stream flows from acceleration gap 460 as shown at arrows 452, 454 to outlet 440 in the noted first axial direction.

In the above noted embodiments, the system automatically adapts the number or size of apertures to the flow, to keep restriction as constant as possible. This is desirable, particularly in internal combustion engine applications in a truck in a braking mode. In other applications, a change in hole or aperture area is done step by step at extended intervals, for example manually at service intervals for the vehicle, particularly when crankcase pressure reaches a predetermined level. In one example, piston 346, FIG. 23, can be manually changed between different positions at service intervals and retained by a retainer such as a detent, latch, finger in slot, or the like, in a fixed axial position until the next further service interval, at which the service technician will determine if the piston should be moved to a different axial position to cover or uncover more or less apertures 354 until the next service interval, and so on. In another example, the disks such as 84 of FIG. 3 or 100 of FIG. 4 may be fixed in place at a service interval and remain so fixed until the next service interval, at which time they may be adjusted and moved by the service technician, and remain so adjusted until a subsequent service interval, and so on. In another example, a pair of disks may be provided which can be angularly rotated or slid relative to each other and locked in position, with a series of detents or clicks, with gradations indicating to the service technician a given setting corresponding to a given crankcase pressure reading. The mechanic will then manually slide or rotate a disk or other variable actuator to a given set position, to accommodate wear since the last service interval and to correspond to a current crankcase pressure reading as the engine ages.

Figure 27:
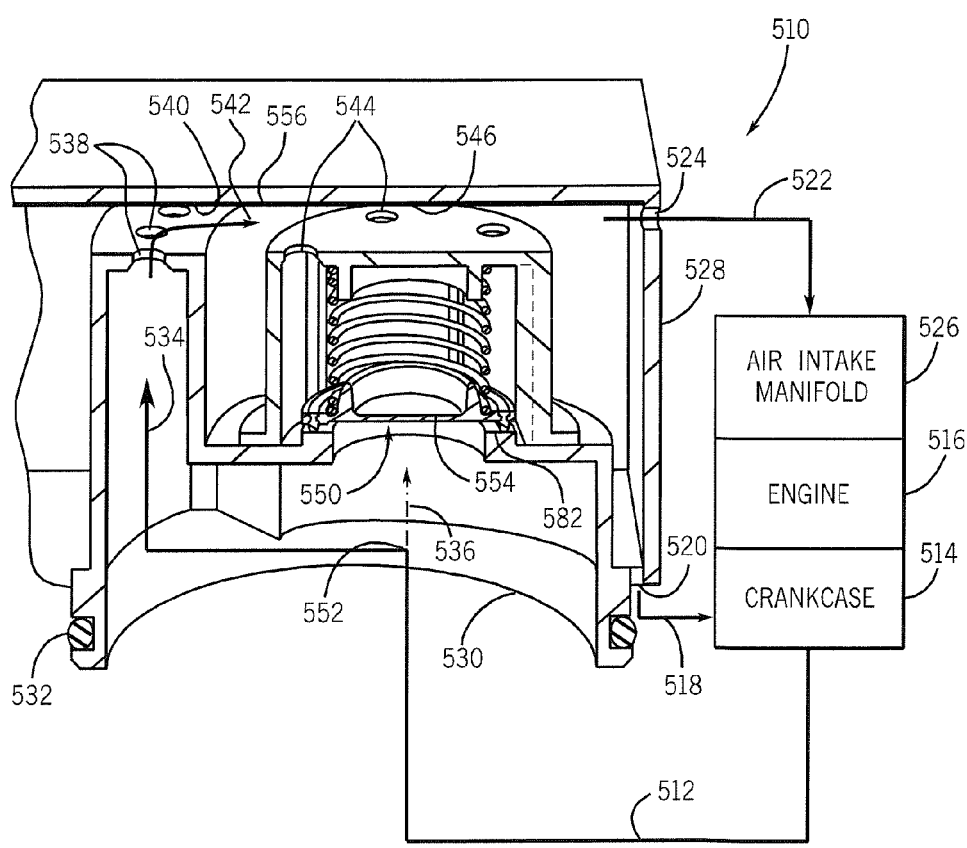

FIG. 27 shows an inertial gas-liquid separator 510 for removing liquid particles from a gas-liquid stream 512, for example oil particles from a blowby gas stream from crankcase 514 of internal combustion engine 516. In such embodiment, the separator returns separated oil 518 at drain 520 to crankcase 514, and returns separated air 522 at outlet 524 to air intake manifold 526 of the engine. In such application, it is desired to vent blowby gases from crankcase 514 of engine 516. Untreated, these gases contain particulate matter in the form of oil mist and soot. It is desirable to control the concentration of the contaminants, especially if the blowby gases are to be recirculated back to the engine's air intake system, for example at air intake manifold 526. The oil mist droplets are generally less than 5 μm in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, as well as other inertial gas-liquid impactor separator applications.

Figure 28:
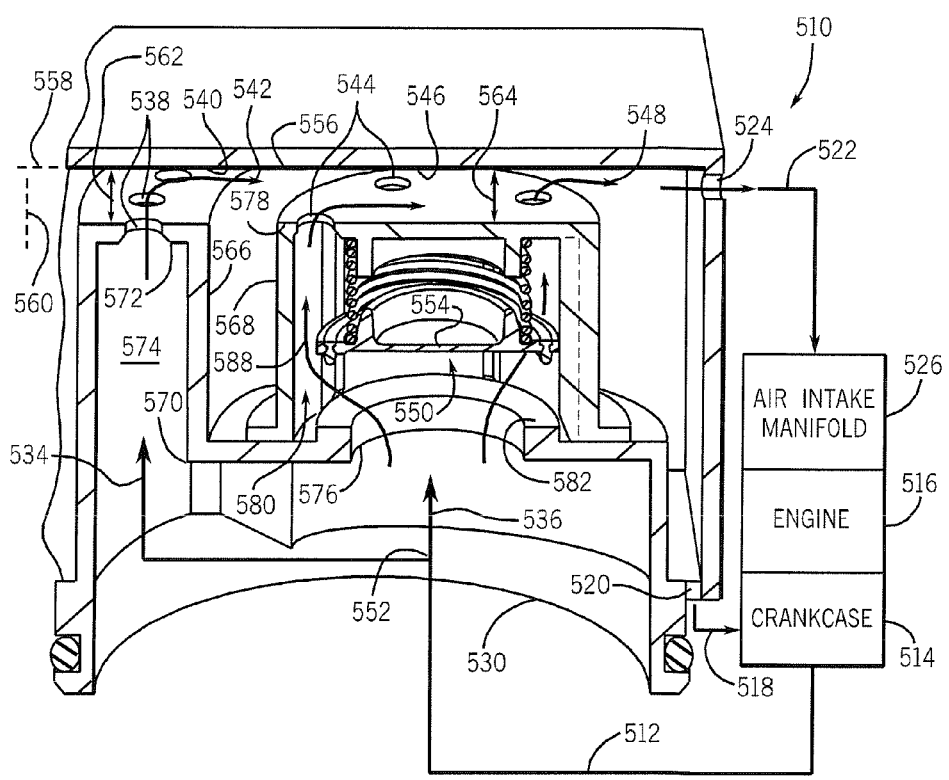

Separator 510 includes a housing 528 having an inlet 530 for receiving gas-liquid stream 512, and an outlet 524 for discharging a gas stream 522. The inlet may have a gasket such as O-ring 532 for sealed mounting to a component such as an engine crankcase. First and second flow branches 534 and 536, FIGS. 27, 28, are provided through the housing from inlet 530 to outlet 524. First flow branch 534 has a set of one or more nozzles 538 receiving gas-liquid stream 512 from inlet 530 and accelerating the gas-liquid stream in the first flow branch in a downstream direction through the first set of one or more nozzles 538 against a first inertial impactor collector 540 in the housing in the path of the accelerated gas-liquid stream through first flow branch 534 and causing liquid particle separation. Inertial impactor collector 540 in the housing is in the path of the accelerated gas-liquid stream and causes liquid particle separation by a sharp directional change as shown at 542. In the preferred embodiment, impactor collector 540 has a rough porous collection or impingement surface causing liquid particle separation from the gas-liquid stream, and is like that shown in U.S. Pat. No. 6,290,738, incorporated herein by reference. In another embodiment, a smooth impervious impingement surface is used, providing a sharp cut-off size particle separation, as noted in the '738 patent. Nozzles 538 may be provided by orifices having a venturi or frustoconical shape as in the incorporated '738 patent. Second flow branch 536 has a second set of one or more nozzles 544 receiving the gas-liquid stream from inlet 530 and accelerating the gas-liquid stream in second flow branch 536 in a downstream direction through the second set of one or more nozzles 544 and against a second inertial impactor collector 546 in the housing in the path of the accelerated gas-liquid stream through second flow branch 536 and causing liquid particle separation by a sharp directional change as shown at 548, FIG. 28. A variable controller 550 in second branch 536 controls flow therethrough.

Figure 29:
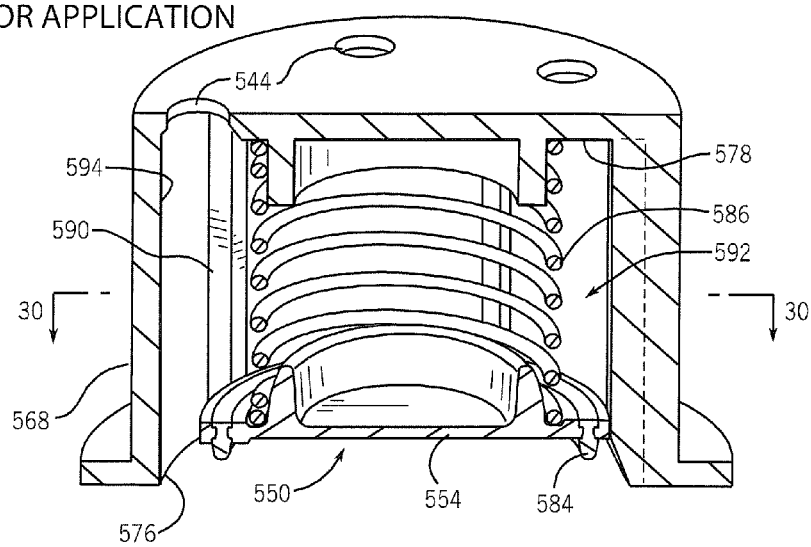
Figure 30:
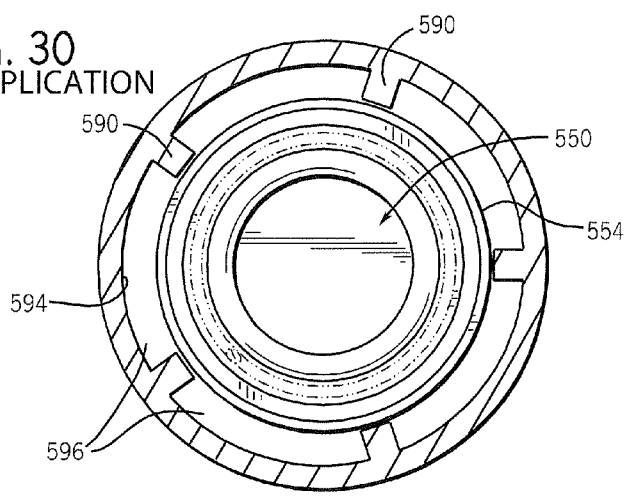
Figure 31:
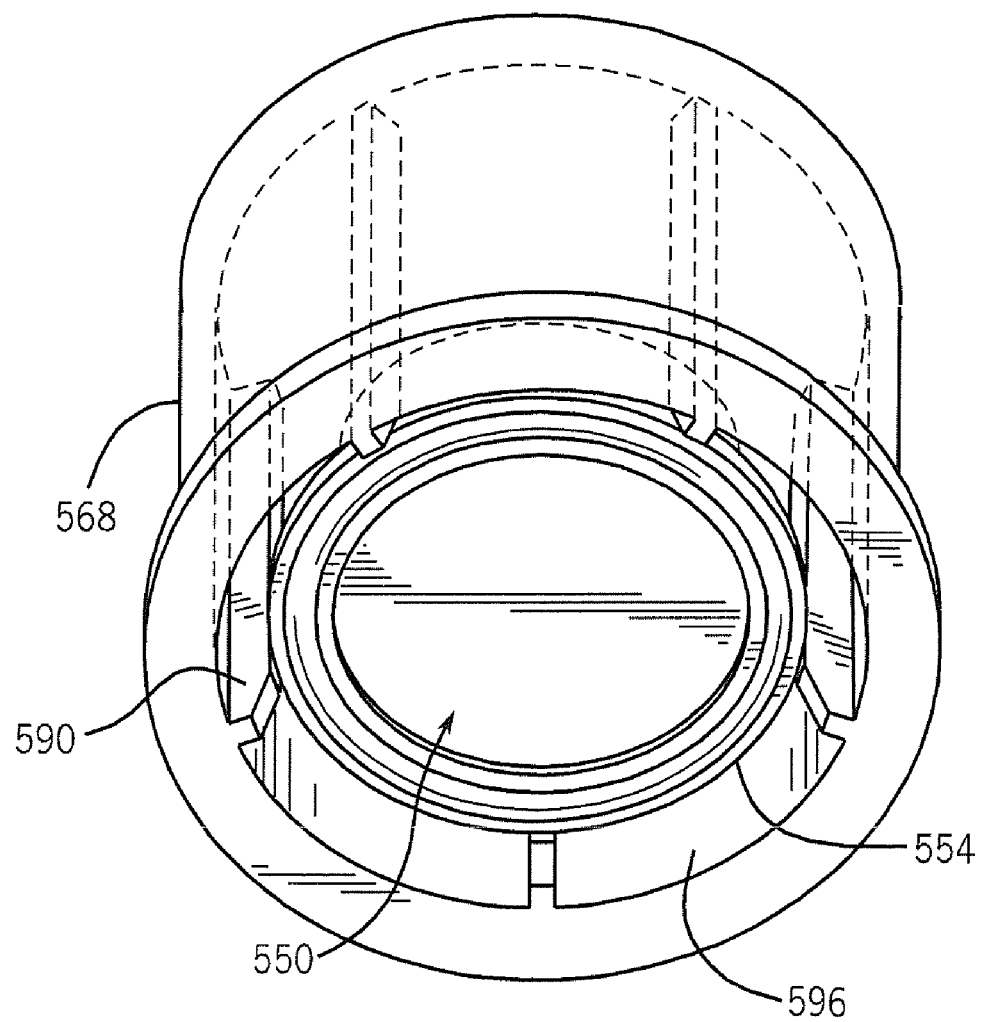

Variable controller 550, FIGS. 29-31, in second flow branch 536, FIGS. 27, 28, is responsive to pressure of gas-liquid stream 512. Variable controller 550 in second flow branch 536 is upstream of the noted second set of one or more nozzles 544. First and second flow branches 530 and 536 preferably diverge at a junction 552 downstream of inlet 530, and variable flow controller 550 is preferably downstream of such junction 552. First flow branch 534 is continuously open such that gas-liquid stream 512 can continuously flow therethrough and through the first set of one or more nozzles 538. Variable flow controller 550 includes a valve 554, to be described, actuatable to control flow through second flow branch 536 and the second set of one or more nozzles 544. Valve 554 is preferably a pressure relief valve responsive to increasing pressure of gas-liquid stream 512. Valve 554 may be actuatable between open and closed positions respectively passing and blocking flow through second flow branch 536 and the second set of one or more nozzles 544, which valve opens responsive to increasing pressure of gas-liquid stream 512. Flow branch 534 provides a first stage, and one or more flow branches such as 536 provide second, third and so on stages, one of which is shown at 536. Respective valves 554 may open at different pressures to provide a staggered sequentially opening multistage array providing staggered sequentially increasing flow area. In another embodiment, valve 554, rather than on/off, may provide a variable opening variably increasing the size of the opening to variably increase flow area through second branch 536 in response to increasing pressure of gas-liquid stream 512, including for example as in the above noted parent '603 and '688 applications. This multistage effect enables the above noted advantages including providing increased separation efficiency early in the life of the engine without suffering objectionably high pressure drop late in the life of the engine including end-of-life condition of the engine.

Gas-liquid stream 512 flows through the first and second sets of nozzles along parallel flow paths 534 and 536. The noted first and second inertial impactor collectors 540 and 546 share in one embodiment a common impaction plate 556 at impaction zones 540 and 546 laterally spaced along a lateral direction 558 normal to the direction of flow 560 along each of the noted parallel paths. The distance 562 between the first set of nozzles 538 and the first inertial impactor collector 540 is constant. Variable flow controller 550 is movable to control flow through second branch 536, and the distance 564 between the second set of one or more nozzles 544 and second inertial impactor collector 546 is constant, including during movement of variable flow controller 550. Distance 562 is preferably equal to distance 564.

First and second side-by-side chimneys 566 and 568 are provided in housing 528. Each chimney defines a respective axially extending flow path therethrough, as shown at 534 and 536. First chimney 566 has a first axial end 570 receiving gas-liquid stream 512 from housing inlet 530, and has a distally opposite second axial end 572 having the first set of one or more nozzles 538 therethrough. First chimney 566 has a first axial flow passage 574 therethrough between first and second axial ends 570 and 572, which axial flow passage 574 provides the noted first flow branch 534. Second chimney 568 has a first axial end 576 receiving gas-liquid stream 512 from housing inlet 530, and has a distally opposite second axial end 578 having the second set of one or more nozzles 544 therethrough. Second chimney 568 defines a second axial flow passage 580 therethrough between the first and second axial ends 576 and 578, which axial flow passage 580 provides the noted second flow branch 536.

Variable flow controller 550 is axially movable in second chimney 568, FIGS. 27, 28, along axial flow passage 580. Variable flow controller 550 preferably includes a valve member 554, which preferably includes a disc or the like, axially movable into and out of engagement with a valve seat 582 formed in second chimney 568, to respectively close and open second flow branch 536, as shown in FIGS. 27 and 28, respectively. Disc valve member 554 may include an annular gasket 584, FIG. 29, for sealingly engaging valve seat 582. Valve seat 582 is at the noted first axial end 576 of second chimney 568. A biasing member such as helical compression spring 586, FIG. 29, bears between the noted second axial end 578 of second chimney 568 and valve member disc 554 and biases valve member 554 to a normally closed position, FIG. 27, against valve seat 582. Valve member 554 is axially movable upwardly in FIGS. 27, 28 to an open position, FIG. 28, in response to pressure of gas-liquid stream 512 overcoming the bias of biasing member 586. Valve member 554 in the open position of FIG. 28 permits flow of the gas-liquid stream axially as shown at arrow 588 through second chimney 568 to the second set of one or more nozzles 544 at the noted second axial end 578 of chimney 568.

Variable flow controller 550 is preferably an axially movable valve member 554, as noted. Second chimney 568 has a plurality of guide track ribs 590, FIG. 31, extending axially along axial flow passage 580 and circumferentially spaced, FIG. 30, around and disposed radially outwardly of valve member 554 and guiding valve member 554, which may be a disc as above noted, for axial movement along such guide track ribs 590. Chimney 568 has an axially extending inner cavity 592, FIG. 29, having an inner cavity wall 594 spaced radially outwardly of valve member disc 554. Inner cavity wall 594 has the noted guide track ribs 590 protruding radially inwardly therefrom. Guide track ribs 590 are circumferentially spaced by arcuate gaps 596, FIG. 30, between respective guide track ribs 590 and between inner cavity wall 594 and valve member disc 554. Gas-liquid stream 512 in second flow branch 536 flows axially through arcuate gaps 596.

Figure 32:
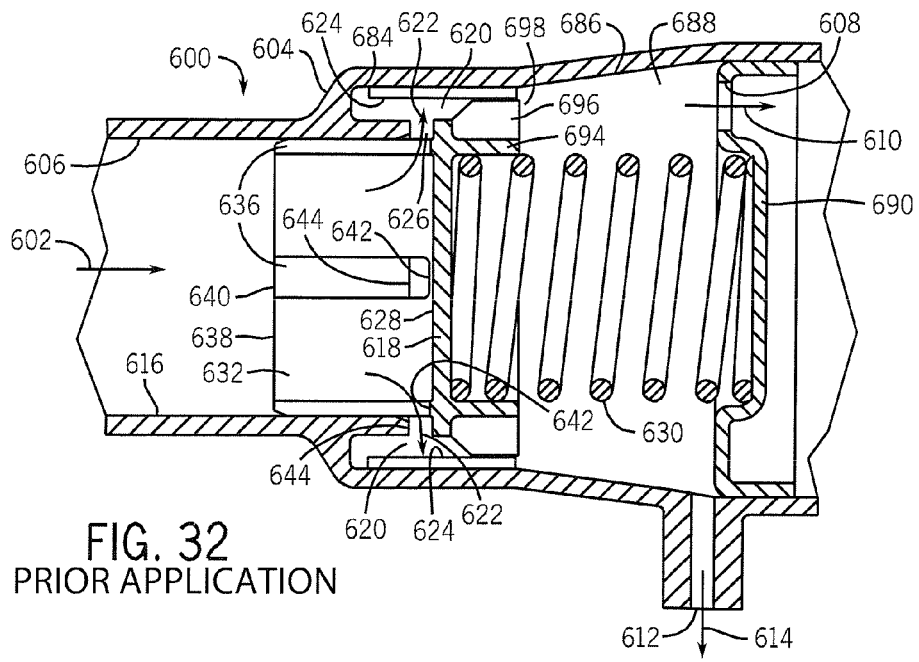

FIG. 32 shows an inertial gas-liquid separator 600 for removing liquid particles from a gas-liquid stream 602. The separator includes a housing 604 directing the gas-liquid stream from upstream to downstream therethrough (left to right in FIG. 32). The housing has an inlet 606 receiving the gas-liquid stream, an outlet 608 discharging a gas stream 610, and a drain port 612 discharging separated liquid 614. The housing has a housing sleeve 616 directing the gas-liquid flow axially along a downstream axial flow direction as shown at 602 against an axially movable plunger 618 which is biased in an upstream axial direction (leftwardly in FIG. 32) against the noted downstream axial flow. Variable nozzle orifice jet structure 620 co-acts between housing sleeve 616 and plunger 618 and accelerates the gas-liquid stream radially outwardly therethrough as shown at arrow 622 against an inertial impactor collector 624 in the housing for liquid particle separation. Variable orifice jet nozzle structure 620 has a variable orifice area 626 dependent upon axial movement (left-right) of plunger 618 relative to housing sleeve 616.

Plunger 618 has a laterally spanning disk 628 facing axially upstream (leftwardly in FIG. 32) and impinged by gas-liquid stream 602 flowing axially downstream (rightwardly in FIG. 32) through housing sleeve 616 and against disk 628. The greater the pressure of gas-liquid stream 602 the greater the axial downstream movement of plunger 618 against the bias thereof, supplied by biasing spring 630, and the greater the variable orifice area 626. Plunger 618 has a plunger sleeve 632, FIG. 36, extending axially upstream (leftwardly in FIGS. 32, 36) from disk 628 and telescopically axially slidable along housing sleeve 616 in guided relation. Variable orifice jet nozzle structure 620 is formed along plunger sleeve 632. Plunger sleeve 632 is axially telescopically movable between retracted and extended positions relative to housing sleeve 616. The extended position is in the downstream axial direction against the bias of biasing spring 630 and increases variable orifice area 626. Plunger sleeve 632 is provided by a circumferential sidewall 634, FIG. 36, extending axially upstream from disk 628. Variable orifice jet nozzle structure 620 formed along plunger sleeve 632 is provided by one or more axially elongated slots 636 extending axially along and radially through sidewall 634 and passing the gas-liquid stream radially therethrough as shown at arrow 622. Circumferential sidewall 634 of plunger sleeve 632 has an upstream axial end 638. The one or more axially elongated slots 636 have open upstream ends 640 at upstream axial end 638 of circumferential sidewall 634, and have closed downstream ends 642, FIG. 32. Housing sleeve 616 has a downstream axial end 644. The greater the downstream axial movement and extension of plunger sleeve 632 relative to housing sleeve 616 the greater the exposed axial length of the one or more axially elongated slots 636 downstream beyond the downstream axial end 644 of housing sleeve 616 which are radially exposed to inertial impactor collector 624.

Figure 33:
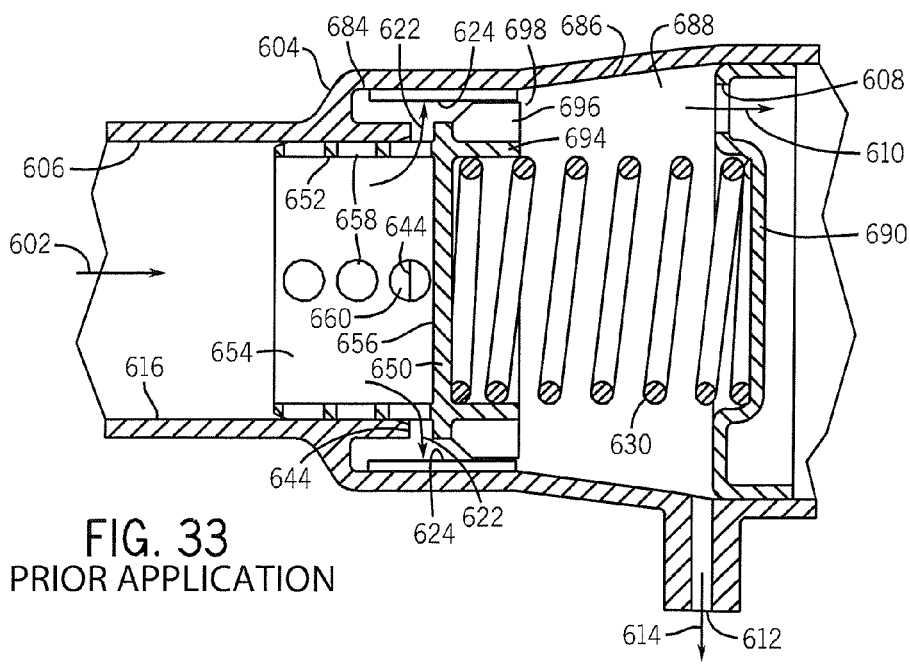

FIG. 33 shows another embodiment and uses like reference numerals from above where appropriate to facilitate understanding. Plunger 650 has a plunger sleeve 652 provided by a circumferential sidewall 654 extending axially upstream from plunger disk 656. The variable orifice jet nozzle structure is formed along plunger sleeve 652 by a plurality of apertures 658 through circumferential sidewall 652 and passing the gas-liquid stream radially outwardly therethrough as shown at arrow 622. Two of the apertures such as 658, 660 are at differing axial locations along circumferential sidewall 654. The greater the downstream axial movement and extension of plunger sleeve 652 relative to housing sleeve 616 the greater the number of exposed apertures 660, 658, etc. beyond downstream axial end 644 of housing sleeve 616 which are radially exposed to inertial impactor collector 624.

Figure 34:
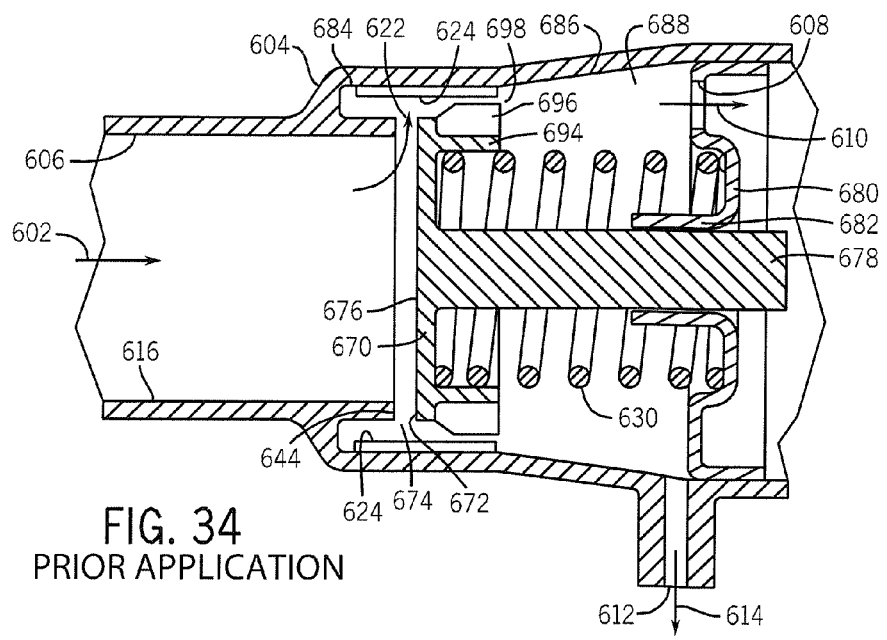
Figure 35:
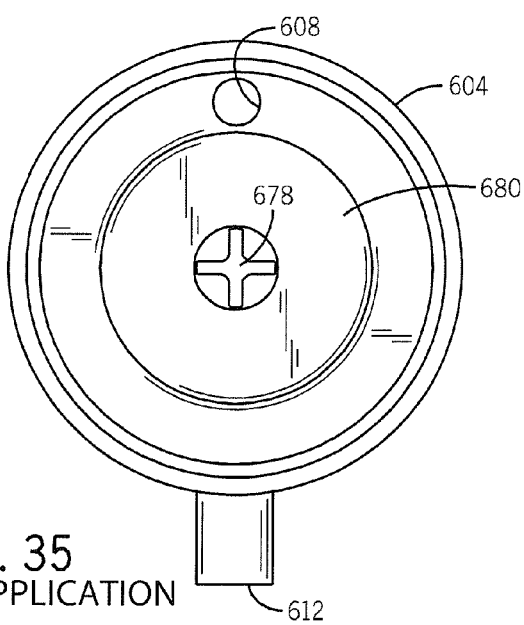

FIGS. 34, 35 show another embodiment, and use like reference numerals from above where appropriate to facilitate understanding. Plunger 670 has a flange 672 facing upstream toward downstream axial end 644 of housing sleeve 616 and variably separable therefrom by a variable axial gap 674 therebetween providing the variable orifice area through which the gas-liquid stream flows radially outwardly as shown at arrow 622 against inertial impactor collector 624. Variable axial gap 674 is dependent upon axial movement (left-right in FIG. 34) of plunger 670. Flange 672 is an outer circumferential perimeter of disk 676. Plunger 670 has a downstream position with flange 672 axially spaced downstream (rightwardly in FIG. 34) from downstream axial end 644 of housing sleeve 616 and with variable axial gap 674 being a continuous annulus passing the gas-liquid stream radially therethrough as shown at arrow 622 and against inertial impactor collector 624. Plunger 670 has a stem 678, FIGS. 34, 35, extending axially downstream (rightwardly in FIG. 34) from disk 676. A bracket 680 is mounted in the housing downstream of inertial impactor collector 624 and receives stem 678 in axially slidable relation at sleeve 682 to guide axial movement of plunger 670.

The housing sleeve, FIGS. 32-34, includes an upstream housing sleeve as shown at 616 having a downstream axial end 644, and includes a downstream housing sleeve 684 having an inner surface having inertial impactor collector 624 thereon and facing radially inwardly toward the noted variable orifice jet nozzle structure. Downstream housing sleeve 684 extends axially downstream (rightwardly in FIGS. 32-34) from inertial impactor collector 624 along a taper 686 providing increased plenum volume 688. A bracket 690 in FIGS. 32, 33, 680 in FIG. 34, is mounted in the housing and provides a wall spanning the downstream housing sleeve 684 downstream of the inertial impactor collector and the plunger and the drain port. Opening 608 through the wall provides the noted outlet discharging the gas stream therethrough as shown at arrow 610. Drain port 612 is gravitationally below outlet 608. The separated liquid and the gas stream flow axially downstream (rightwardly in FIGS. 32-34) from inertial impactor collector 624 in the same axial direction along downstream housing sleeve 684. Helical compression spring 630 axially bears between the respective bracket 690, 680 and the plunger 618, 650, 670 and biases the plunger in an upstream axial direction (leftwardly in FIGS. 32-34).

Figures 36, 37:
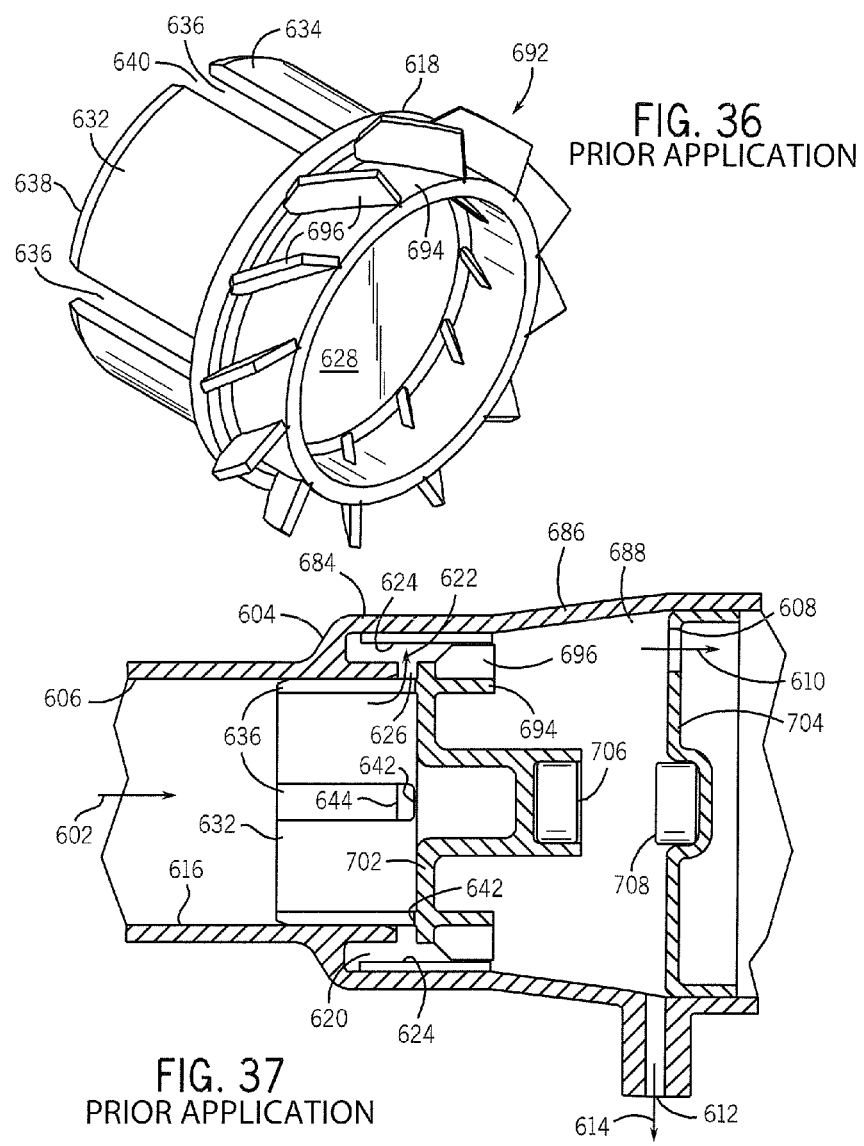

Post-impaction vortex flow separation structure 692, FIG. 36, is provided in the housing downstream of inertial impactor collector 624 and creating swirling divergent vortex flow aiding removal of separated liquid particles. Plunger 618 has a plunger skirt 694, FIGS. 32, 36, extending axially downstream (rightwardly in FIG. 32) from the area of liquid particle separation. Plunger skirt 694 has a plurality of angled directional vanes 696, FIG. 36, creating the swirling divergent vortex flow. Plunger skirt 694 and vanes 696 provide the noted post-impaction vortex flow separation structure. Downstream housing sleeve 684 is spaced radially outwardly of plunger skirt 694 by an annular space 698. Vanes 696 extend from plunger skirt 694 radially outwardly into annular space 698. Downstream plunger skirt 694 and vanes 696 may be provided on plungers 650, 670 as shown.

FIG. 37 shows a further embodiment and uses like reference numerals from above where appropriate to facilitate understanding. Plunger 702 is magnetically biased in the upstream axial direction (leftwardly in FIG. 37). Bracket 704 in the housing is downstream of inertial impactor collector 624. First and second opposing magnets 706 and 708 are provided, with the first magnet 706 being on plunger 702, and the second magnet 708 being on bracket 704. Magnets 706 and 708 apply opposing repelling magnetic force therebetween to magnetically bias plunger 702 in the upstream axial direction (leftwardly in FIG. 37).

Figure 38:
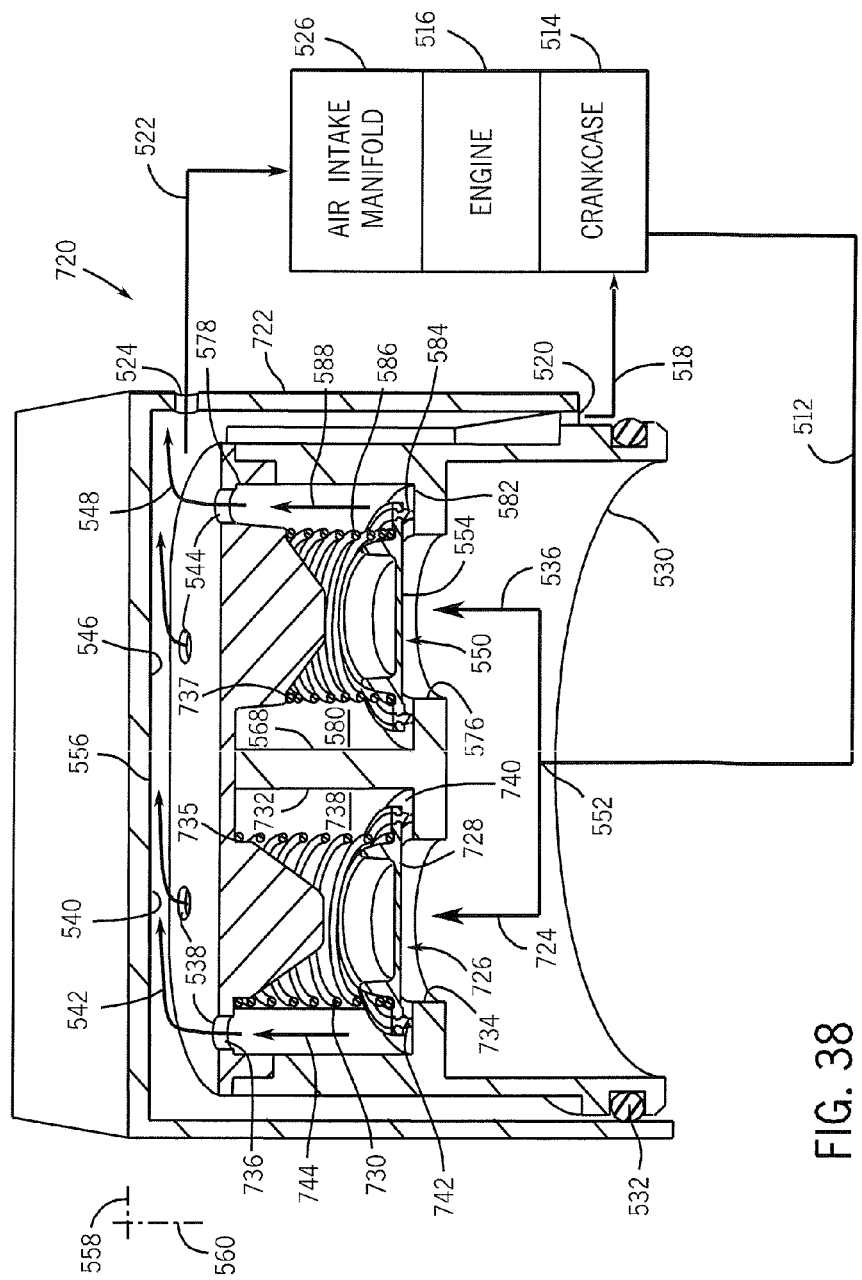

FIG. 38 shows an inertial gas-liquid separator 720 for removing liquid particles from gas-liquid stream 512, for example oil particles from a blowby gas stream from crankcase 514 of internal combustion engine 516. In such embodiment, the separator returns separated oil 518 at drain 520 to crankcase 514, and returns separated air 522 at outlet 524 to air intake manifold 526 of the engine. In such application, it is desired to vent blowby gases from crankcase 514 of engine 516. Untreated, these gases contain particulate matter in the form of oil mist and soot. It is desirable to control the concentration of the contaminants, especially if the blowby gases are to be recirculated back to the engine's air intake system, for example at air intake manifold 526. The oil mist droplets are generally less than 5µ in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, including in diesel engine applications, as well as other inertial gas-liquid impactor separator applications.

Separator 720 includes a housing 722 having an inlet 530 for receiving gas-liquid stream 512, and an outlet 524 for discharging a gas stream 522. The inlet may have a gasket such as O-ring 532 for sealed mounting to a component such as an engine crankcase. First and second flow branches 724 and 536 are provided through the housing from inlet 530 to outlet 524. First flow branch 724 has a first set of one or more nozzles 538 receiving gas-liquid stream 512 from inlet 530 and accelerating the gas-liquid stream in first flow branch 724 in a downstream direction through the first set of one or more nozzles 538 against a first inertial impactor collector 540 in the housing in the path of the accelerated gas-liquid stream through first flow branch 724 and causing liquid particle separation. Inertial impactor collector 540 in the housing is in the path of the accelerated gas-liquid stream and causes liquid particle separation by a sharp directional change as shown at 542. In the preferred embodiment, impactor collector 540 has a rough porous collection or impingement surface causing liquid particle separation from the gas-liquid stream, and is like that shown in U.S. Pat. No. 6,290,738, incorporated herein by reference. In another embodiment, a smooth impervious impingement surface is used, providing a sharp cut-off size particle separation, as noted in the '738 patent. Nozzles 538 may be provided by orifices having a venturi or frustoconical shape as in the incorporated '738 patent. Second flow branch 536 has a second set of one or more nozzles 544 receiving the gas-liquid stream from inlet 530 and accelerating the gas-liquid stream in second flow branch 536 in a downstream direction through the second set of one or more nozzles 544 and against a second inertial impactor collector 546 in the housing in the path of the accelerated gas-liquid stream through second flow branch 536 and causing liquid particle separation by a sharp directional change as shown at 548. A first variable flow controller 726 in first branch 724 controls flow therethrough. A second variable flow controller 550 in second branch 536 controls flow therethrough.

First variable flow controller 726 in first flow branch 724 is responsive to pressure of gas-liquid stream 512. Second variable flow controller 550 in second flow branch 536 is responsive to pressure of gas-liquid stream 512. First variable flow controller 726 in first flow branch 724 is upstream of the noted first set of one or more nozzles 538. Second variable flow controller 550 in second flow branch 536 is upstream of the noted second set of one or more nozzles 544. First and second flow branches 724 and 536 preferably diverge at a junction 552 downstream of inlet 530. Each of the noted first and second variable flow controllers 726 and 550 is preferably downstream of such junction 552. First variable controller 726 includes a valve 728, comparable to valve 554 described above, actuatable to control flow through first flow branch 724 and the first set of one or more nozzles 538. Second variable flow controller 550 includes a second valve, provided by the above noted valve 554, actuatable to control flow through second flow branch 536 and the second set of one or more nozzles 544.

Each of first and second valves 728 and 554 is preferably a pressure relief valve responsive to increasing pressure of gas-liquid stream 512 to increase flow through the respective flow branch 724 and 536. First valve 728 is actuatable between open and closed positions respectively passing and blocking flow through first flow branch 724 and the first set of one or more nozzles 538. FIG. 38 shows valve 728 in the closed position. FIG. 28 shows valve 554, which is comparable to valve 728, in an open position. Second valve 554, FIG. 38, is actuatable between open and closed positions, FIGS. 28 and 38, respectively passing and blocking flow through second flow branch 536 and the second set of one or more nozzles 544. Each of first and second valves 724 and 536 opens in response to increasing pressure of gas-liquid stream 512.

In one embodiment, first valve 728 opens at a lower pressure of gas-liquid stream 512 than second valve 554. First valve 728 is biased toward the closed position (downwardly in FIG. 38) with a first biasing force provided by helical compression spring 730. Second valve 554 is biased toward the closed position (downwardly in FIG. 38) with a second biasing force provided by helical compression spring 586. The first biasing force is less than the second biasing force, for example by providing biasing member 730 with a lower spring constant than biasing member 586 and/or providing biasing member 730 with a different axial compression height along axis 560 than biasing member 586, or any other differential biasing. For example, in one embodiment, the upper axial end 578 of axial flow passage 580 of chimney 568 has an axially downwardly extended shoulder 737 providing a spring seat against which the upper end of spring 586 bears, to thus provide the noted differential biasing, as compared to spring 730, by providing a different axial compression height along axis 560. Valves 728 and 554 open at different pressures to provide a staged sequentially opening multistage array providing staggered sequentially increasing flow area. Either or both of the valves, rather than on/off, may provide a variable opening variably increasing the size of the opening to variably increase flow area through the respective branch in response to increasing pressure of gas-liquid stream 512, for example as noted above, and to be further described. This multistage effect enables the above noted advantages including providing increased separation efficiency early in the life of the engine without suffering objectionably high pressure drop late in the life of the engine including end-of-life condition of the engine.

Gas-liquid stream 512 flows through the first and second sets of nozzles 538 and 544 along parallel flow paths 724 and 536. The noted first and second inertial impactor collectors 540 and 546 share in one embodiment a common impaction plate 556, as above, at impaction zones 540 and 546 laterally spaced along lateral direction 558 normal to the direction of flow 560 along each of the noted parallel paths.

First and second side-by-side chimneys 732 and 568 are provided in housing 722. Each chimney defines a respective axially extending flow path therethrough as shown at 724 and 536. First chimney 732 has a first axial end 734 receiving gas-liquid stream 512 from housing inlet 530, and has a distally opposite second axial end 736 having the first set of one or more nozzles 538 therethrough. First chimney 732 defines a first axial flow passage 738 therethrough between first and second axial ends 734 and 736, which axial flow passage 738 provides the noted first flow branch 724. Second chimney 568 has the noted first axial end 576 receiving gas-liquid stream 512 from housing inlet 530, and has the noted distally opposite second axial end 578 having the second set of one or more nozzles 544 therethrough. Second chimney 568 defines the noted second axial flow passage 580 therethrough between first and second axial ends 576 and 578 of second chimney 568, which axial flow passage 580 provides the noted second flow branch 536.

First variable controller 726 is axially movable (up-down in FIG. 38) in first chimney 732 along axial flow passage 738. Second variable controller 550 is axially movable in second chimney 568 along second axial flow passage 580. First variable controller 726 preferably includes first movable valve member 728 axially movable into and out of engagement with a first valve seat 740 formed in first chimney 732, to respectively close and open first flow branch 724. Second variable controller 550 preferably includes the noted second movable valve member 554 axially movable into and out of engagement with a second valve seat 582, as noted above, formed in second chimney 568, to respectively close and open second flow branch 536, as above. Valve members 728 and 554 may be provided by disks and include respective annular gaskets 742 and 584 for sealingly engaging respective valve seats 740 and 582. First valve seat 740 is at first axial end 734 of first chimney 732. Biasing member 730, such as the noted helical compression spring, bears between second end 736 of first chimney 732 and first valve member 728 and biases valve member 728 to a normally closed position against first valve seat 740. First valve member 728 moves axially away from first valve seat 740 (upwardly in FIG. 38) to an open position in response to pressure of gas-liquid stream 512 overcoming first biasing member 730. First valve member 728 in the noted open position permits flow of gas-liquid stream 512 axially as shown at arrow 744 through first chimney 732 to the first set of one or more nozzles 538 at second axial end 736 of first chimney 732. Second valve seat 582 is at first axial end 576 of second chimney 568. Second biasing member 586 bears between second axial end 578 of second chimney 568, preferably at axially extended shoulder seat 737, and second valve member 554 and biases second valve member 554 to a normally closed position against second valve seat 582. Second valve member 554 moves axially away from second valve seat 582 (upwardly in FIG. 38, as shown in FIG. 28) to an open position in response to pressure of gas-liquid stream 512 overcoming second biasing member 586. Second valve member 554 in the noted open position permits flow of gas-liquid stream 512 axially as shown at arrow 588 through second chimney 568 to the second set of one or more nozzles 544 at second axial end 578 of second chimney 568. Second axial end 736 of first chimney 732 includes a spring seat 735 against which spring 730 bears. Helical compression spring 730 bears between valve member 728 and spring seat 735. Helical compression spring 586 bears between valve member 554 and spring seat 737. Spring seat 735 is spaced from valve seat 740 by a first axial distance along axial direction 560. Extended spring seat 737 is spaced from valve seat 582 by a second axial distance along axial direction 560. The noted first axial distance is greater than the noted second axial distance. The chimneys are provided with guide track structure, as above, for example guide track ribs 590, for guiding the respective valve member disk such as 554. The chimneys may have the noted axially extending circumferential cavities such as 592, FIG. 29, for flow of gas-liquid stream 512 through arcuate gaps such as 596.

In further embodiments, the housing may have one or more sleeves such as 616, FIGS. 32-37, directing the gas-liquid stream through at least one of the flow branches 724 and 536 to flow axially along a downstream axial flow direction 560, 602 against an axially movable plunger such as 618 providing the respective variable flow controller. The respective set of one or more nozzles may be provided by variable nozzle orifice jet structure such as 620 co-acting between housing sleeve 616 and plunger 618 and accelerating the gas-liquid stream radially outwardly therethrough as shown at arrow 622 against a respective inertial impactor collector such as 624 in the housing for liquid particle separation. The plunger such as 618 is biased in an upstream axial direction (leftwardly in FIG. 32) against the noted downstream axial flow as shown at 602. Variable nozzle orifice jet structure 620 has a variable orifice area 626 providing variable radial flow therethrough dependent upon axial movement of plunger 618 (left-right in FIG. 32). Plunger 618 has a laterally spanning disk 628 facing axially upstream (leftwardly in FIG. 32) and impinged by gas-liquid stream 602 flowing axially downstream (rightwardly in FIG. 32) through housing sleeve 616 and against disk 628. The greater the pressure of gas-liquid stream 602 the greater the axial downstream movement of plunger 618 against the bias thereof, supplied by biasing spring 630, and the greater the variable orifice area 626.

In one embodiment, the system provides a method for separating oil from blowby gas of an internal combustion engine, including providing increased separation efficiency early in the life of the engine without suffering objectionably high pressure drop late in the life of the engine including end-of-life condition of the engine. The method includes providing an inertial air-oil separator 720 for removing oil particles from blowby gas 512, providing the separator with a housing 722 having an inlet 530 for receiving a blowby gas stream 512 from the engine, and an outlet 524 for discharging an air stream 522, providing first and second flow branches 724 and 536 through housing 722 from inlet 530 to outlet 524, providing the first flow branch 724 with a first set of one or more nozzles 538 receiving the blowby gas stream from inlet 530 and accelerating the blowby gas stream in the first flow branch 724 in a downstream direction through the first set of one or more nozzles 538 and against a first inertial impactor collector 540 in the housing in the path of the accelerated blowby gas stream through the first flow branch 724 and causing oil particle separation, providing the second flow branch 536 with a second set of one or more nozzles 544 receiving blowby gas stream 512 from inlet 530 and accelerating the blowby gas stream in the second flow branch 536 in a downstream direction through the second set of one or more nozzles 544 and against a second inertial impactor collector 546 in the housing in the path of the accelerated blowby gas stream through the second flow branch 536 and causing oil particle separation, providing a first variable flow controller 726 in the first flow branch 724, controlling flow through the first flow branch 724 in response to pressure of blowby gas stream 512, providing a second variable flow controller 550 in the second flow branch 536, controlling flow through the second flow branch 536 in response to pressure of the blowby gas stream 512, responding to increasing pressure of the blowby gas stream 512 to increase flow of the blowby gas stream through first flow branch 724, responding to further increasing pressure of blowby gas stream 512 to increase flow of the blowby gas stream through second flow branch 536, such that during the life of the engine, flow through the housing 722 is staggered sequentially in increasing stages, namely a first stage through first flow branch 724 controlled by first variable flow controller 726, and then additionally and cumulatively in a second stage through second flow branch 536 controlled by second variable controller 550. The method further includes providing the first variable flow controller 726 in first flow branch 724 upstream of the first set of one or more nozzles 538, providing the second variable flow controller 550 in the second flow branch 536 upstream of the second set of one or more nozzles 544, and diverging the first and second flow branches 724 and 536 from each other at a junction 552 downstream of inlet 530 and upstream of each of the first and second variable flow controllers 726 and 550.

Present Application

FIG. 39 shows an inertial gas-liquid impactor separator 810 for removing liquid particles from a gas-liquid stream 812, for example oil particles from a blowby gas stream from crankcase 814 of internal combustion engine 816. In such embodiment, the separator returns separated oil 818 at drain 820 to crankcase 814, and returns separated air 822 at outlet 824 to air intake manifold 826 of the engine or to atmosphere. In such application, it is desired to vent blowby gases from crankcase 814 of engine 816. Untreated, these gases contain particulate matter in the form of oil mist and soot. It is desirable to control the concentration of the contaminants, especially if the blowby gases are to be recirculated back to the engine's air intake system, for example at air intake manifold 826. The oil mist droplets are generally less than 5 microns in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, including in diesel engine applications, as well as other inertial gas-liquid impactor separator applications.

Separator 810 includes a housing 828 having an inlet 830 for receiving gas-liquid stream 812, and an outlet 824 for discharging a gas stream 822. The housing has a nozzle plate or dividing wall 832 having one or more nozzles provided by orifices such as 834 therethrough receiving the gas-liquid stream 812 from inlet 830 and accelerating the gas-liquid stream therethrough along an axial flow direction 836 from upstream to downstream, which is left to right in FIG. 39. The housing has a media baffle or support wall 838 having an inertial impactor collector 840 in the housing downstream of nozzle 834 and in the path of the accelerated gas-liquid stream and causing liquid particle separation from the gas-liquid stream. Inertial impactor collector 840 causes liquid particle separation by a sharp directional change, for example as in U.S. Pat. No. 7,238,216, incorporated herein by reference. In the preferred embodiment, impactor collector 840 has a rough porous collection or impingement surface causing liquid particle separation from the gas-liquid stream, and is like that shown in U.S. Pat. No. 6,290,738, incorporated herein by reference. In another embodiment, a smooth impervious impingement surface is used, e.g. impactor collector 840 is eliminated, and the surface of wall 838 is used as the impaction surface, providing a sharp cut-off size particle separation, as noted in the '738 patent. Nozzles 834 may be provided by orifices having a venturi or frustoconical shape as in the incorporated '216 and '738 patents.

An axially movable valve 842 controls flow through nozzle 834. A variable flow actuator 844 is upstream of and controls valve 842. Nozzle orifice 834 is provided by a valve seat 846 having an upstream face 848 and an oppositely facing downstream face 850. The gas-liquid stream flows axially through orifice 834, left to right in FIG. 39, from upstream face 848 to downstream face 850. Upstream face 848 faces axially toward actuator 844, i.e. upstream face 848 faces leftwardly in FIG. 39. Valve 842 includes a valve head 852, which may be conical or frustoconical in shape, axially movable toward and away from valve seat 846, as shown at arrow 854. Valve head 852 moves axially rightwardly in FIG. 39 to engage or nearly engage valve seat 846 and close or at least partially close the valve. Valve head 852 moves axially leftwardly in FIG. 39 away from valve seat 846 to open the valve. The valve includes a valve stem 856 extending axially upstream (leftwardly) from valve head 852 and coupled to actuator 844.

In one embodiment, actuator 844 is provided by a diaphragm mounted and sealed to the housing at outer circumferential sealing flange 858 to define a plenum 860 between diaphragm 844 and dividing wall 832. The diaphragm is responsive to pressure of the gas-liquid stream 812. The diaphragm has a first side 862, and an oppositely facing second side 864. First side 862 communicates with inlet 830 and is exposed to incoming flow of gas-liquid stream 812. First side 862 faces axially toward nozzle 834, i.e. first side 862 faces axially rightwardly in FIG. 39. In one embodiment, second side 864 of the diaphragm is non-exposed to gas-liquid stream 812 nor to any portion of the gas-liquid flow path through the housing. First side 862 of the diaphragm is connected to valve stem 856 to move the latter axially left and right, as shown at arrow 854, in response to increasing and decreasing pressure of gas-liquid stream 812, respectively, as the diaphragm flexes in response to pressure changes of the gas-liquid stream 812.

Valve head 852 moves axially toward and away from valve seat 846 to respectively at least partially close and open the valve. Diaphragm 844 exerts a pulling force on valve stem 856 to open the valve in response to increasing pressure of gas-liquid stream 812 against first side 862 of the diaphragm. First side 862 of the diaphragm axially faces upstream face 848 of valve seat 846 and is spaced upstream thereof along an axial direction (leftwardly) opposite to the axial flow direction through orifice 834 (rightwardly). It is preferred that the axial distance between nozzle orifice 834 and inertial impactor collector 840 be fixed and unchanging, including during variance of pressure of gas-liquid stream 812. Valve stem 856 and diaphragm 844 may be separate pieces attached to each other or may be a one-piece unitary member. In the preferred embodiment, the valve in the closed position is only partially closed, to enable limited flow between inlet 830 and outlet 824. In further embodiments, the axial distance between nozzle orifice 834 and inertial impactor collector 840 is variable, e.g. by variably moving wall 832 and/or wall 838 toward and away from each other. In further embodiments, wall 832 and nozzle orifice 834 may be movable, and valve head 852 may be stationary or movable.

In inertial gas-liquid impactor separators it is desirable to maintain constant high flow velocity through nozzle orifices such as 834 without creating additional back pressure as flow increases, e.g. as an engine ages. Ideally, the pressure drop versus aging slope should be zero for a given flow range. Pressure drop varies as a square function of flow, i.e. to the second power. Liquid separation efficiency depends on flow velocity through nozzle orifice 834 and impaction velocity against impactor 840. The variable nozzle orifice area provided by valve 842 enables desired higher flow and impaction velocity without deleteriously increased pressure drop, and enables a lower, flatter slope of pressure drop versus aging. In one embodiment, diaphragm 844 has an inherent bias biasing valve 842 axially rightwardly. Increasing pressure of gas-liquid stream 812 in plenum 860 moves flexible diaphragm 844 axially leftwardly, to increase effective flow area through nozzle orifice 834, and to reduce back pressure. The pressure drop corresponding to increased flow follows a lower, flatter pressure drop slope, which lower pressure drop slope enables higher velocity at low flow, and lower pressure drop at higher flow, which in turn increases efficiency. In one embodiment, changing the taper angle at 852 can optimize the pressure drop versus flow response, without changing diaphragm response. In another embodiment, diaphragm stiffness and shape can be changed to achieve more axial stroke at 854 for the flow response, which in turn reduces fluctuations in pressure drop because of engine vibrations. In the preferred embodiment, the system provides a self-governing continuously variable inertial gas-liquid separator.

In one desirable embodiment, valve 842 and variable flow actuator diaphragm 844 are on the inlet side of nozzle orifice 834, i.e. on the upstream side, axially leftwardly in FIG. 39. This provides a simple mechanism for manufacturing, and enables the valve to be pulled by the actuator to an open position, rather than being pushed against the pressure head of an incoming gas-liquid stream.

FIGS. 40, 41 show another embodiment and use like reference numerals from above where appropriate to facilitate understanding. A plurality of nozzles 834a, 834b, 834c are provided for a plurality of respective valves 842a, 842b, 842c having respective valve stems 856a, 856b, 856c extending axially rightwardly from diaphragm actuator 844. Actuator 844 has a first side 862 facing in a first axial direction (rightwardly in FIG. 40) toward nozzles 834a, 834b, 834c, and an oppositely facing second side 864 facing in a second opposite axial direction (leftwardly in FIG. 40). First side 862 communicates with inlet 830 through plenum 860 and is exposed to incoming flow of gas-liquid stream 812. A biasing member such as a compression spring 866 bears against actuator 844 at second side 864 and biases the actuator in the noted first axial direction (rightwardly in FIG. 40) toward the nozzles. The bias of the spring may be adjusted by a bolt or stud 868 threaded to the housing at housing end portion 870 such that upon turning of bolt 868, plate 872 moves axially left-right, to adjust the bias of spring 866. Housing end portion 870 is connected to the remainder of the housing by a cage section 874 having openings or slots such that the noted second side 864 of diaphragm actuator 844 is exposed to atmosphere. In this embodiment, it is preferred that the bias of spring 866 be adjusted such that the gas-liquid incoming stream pressure at 812 in plenum 860 must first rise above a selected threshold pressure to overcome the bias of spring 866, whereafter the diaphragm actuator 844 moves leftwardly to thus move valves stems 856a, 856b, 856c axially leftwardly to open the noted valves at the noted nozzles.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial gas-liquid separator for removing liquid particles from a gas-liquid stream, comprising a housing having an inlet for receiving a gas-liquid stream, and an outlet for discharging a gas stream, at least one nozzle in said housing receiving said gas-liquid stream from said inlet and accelerating said gas-liquid stream therethrough along an axial flow direction from upstream to downstream, an inertial impactor collector in said housing downstream of said nozzle and in the path of said accelerated gas-liquid stream and causing liquid particle separation from said gas-liquid stream, an axially movable valve controlling flow through said nozzle, and a variable flow actuator upstream of and controlling said valve.

2. The inertial gas-liquid separator according to claim 1 wherein said nozzle comprises an orifice comprising a valve seat having an upstream face and an oppositely facing downstream face, said gas-liquid stream flows axially through said orifice from said upstream face to said downstream face, and said upstream face faces axially toward said actuator.

3. The inertial gas-liquid separator according to claim 2 wherein said valve comprises a valve head axially movable toward and away from said valve seat, and a valve stem extending axially upstream from said valve head and coupled to said actuator.

4. The inertial gas-liquid separator according to claim 1 wherein said actuator comprises a diaphragm responsive to pressure of said gas-liquid stream, said diaphragm has a first side and an oppositely facing second side, said first side of said diaphragm communicates with said inlet and is exposed to incoming flow of said gas-liquid stream, and said first side of said diaphragm faces axially toward said nozzle.

5. The inertial gas-liquid separator according to claim 4 wherein said second side of said diaphragm is non-exposed to said gas-liquid stream.

6. The inertial gas-liquid separator according to claim 4 wherein said second side of said diaphragm is non-exposed to any portion of the gas-liquid flow path through said housing.

7. The inertial gas-liquid separator according to claim 1 wherein said nozzle comprises an orifice comprising a valve seat having an upstream face and an oppositely facing downstream face, said gas-liquid stream flows axially through said orifice from said upstream face to said downstream face, said upstream face faces axially toward said actuator, said valve comprises a valve head axially movable toward and away from said valve seat, and a valve stem extending axially upstream from said valve head and coupled to said actuator, said actuator is responsive to pressure of said gas-liquid stream, said actuator having a first side and an oppositely facing second side, said first side communicates with said inlet and is exposed to incoming flow of said gas-liquid stream, and said first side faces axially toward said nozzle.

8. The inertial gas-liquid separator according to claim 7 wherein said valve stem is on said first side.

9. The inertial gas-liquid separator according to claim 8 wherein said valve head is axially movable toward and away from said valve seat to respectively at least partially close and open said valve, and said actuator exerts a pulling force on said valve stem and valve head to open said valve in response to increasing pressure of said gas-liquid stream against said first side.

10. The inertial gas-liquid separator according to claim 7 wherein said first side axially faces said upstream face of said valve seat and is spaced upstream thereof along an axial direction opposite to said axial flow direction through said orifice.

11. The inertial gas-liquid separator according to claim 1 wherein the axial distance between said nozzle and said inertial impactor collector is fixed and unchanging, including during variance of pressure of said gas-liquid stream.

12. The inertial gas-liquid separator according to claim 1 wherein said nozzle comprises an orifice comprising a valve seat having an upstream face and an oppositely facing downstream face, said gas-liquid stream flows axially through said orifice from said upstream face to said downstream face, said upstream face faces axially toward said actuator, said valve comprises a valve head axially movable toward and away from said valve seat, and a valve stem extending axially upstream from said valve head and coupled to said actuator, said actuator comprises a diaphragm responsive to the pressure of said gas-liquid stream, said diaphragm having a first side and an oppositely facing second side, said first side of said diaphragm communicates with said inlet and is exposed to incoming flow of said gas-liquid stream, said first side of said diaphragm faces axially toward said nozzle, said valve stem is on said first side of said diaphragm, said valve head is axially movable toward and away from said valve seat to respectively at least partially close and open said valve, and said diaphragm exerts a pulling force on said valve stem and valve head to open said valve in response to increasing pressure of said gas-liquid stream against said first side of said diaphragm.

13. The inertial gas-liquid separator according to claim 1 comprising a plurality of said nozzles.

14. The inertial gas-liquid separator according to claim 1 wherein said actuator has a first side facing in a first axial direction toward said nozzle, and an oppositely facing second side facing in a second opposite axial direction, said first side communicates with said inlet and is exposed to incoming flow of said gas-liquid stream, and comprising a biasing member bearing against said actuator at said second side and biasing said actuator in said first axial direction toward said nozzle.

15. The inertial gas-liquid separator according to claim 14 wherein said actuator comprises a diaphragm responsive to pressure of said gas-liquid stream.

* * * * *